US008243908B2

(12) United States Patent
Tischer et al.

(10) Patent No.: US 8,243,908 B2
(45) Date of Patent: *Aug. 14, 2012

(54) SYSTEMS AND METHODS FOR RESTRICTING THE USE AND MOVEMENT OF TELEPHONY DEVICES

(75) Inventors: Steven Tischer, Atlanta, GA (US); Kevin Kleinfelter, Atlanta, GA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/637,264

(22) Filed: Dec. 12, 2006

(65) Prior Publication Data

US 2007/0127644 A1 Jun. 7, 2007

Related U.S. Application Data

(63) Continuation of application No. 10/929,711, filed on Aug. 30, 2004, now Pat. No. 7,200,424, which is a continuation-in-part of application No. 10/195,197, filed on Jul. 15, 2002, now Pat. No. 7,194,083.

(51) Int. Cl.
H04M 3/42 (2006.01)
H04M 1/66 (2006.01)

(52) U.S. Cl. .................................. 379/210.02; 379/200

(58) Field of Classification Search ............... 379/93.02, 379/200, 210.02; 455/567
See application file for complete search history.

(56) References Cited

U.S. PATENT DOCUMENTS

| 3,729,594 A | 4/1973 | Krock et al. |
| 3,906,166 A | 9/1975 | Cooper et al. |
| 3,956,596 A | 5/1976 | Connolly et al. |
| 4,218,590 A | 8/1980 | Rasmussen et al. |
| 4,268,722 A | 5/1981 | Little et al. |
| 4,390,963 A | 6/1983 | Puhl et al. |
| 4,398,265 A | 8/1983 | Puhl et al. |
| 4,421,952 A | 12/1983 | Barnes |

(Continued)

FOREIGN PATENT DOCUMENTS

EP 0 342 707 11/1989

(Continued)

OTHER PUBLICATIONS

US 6,876,861, Apr. 2005, Frank et al. (Withdrawn).

(Continued)

*Primary Examiner* — Rasha S Al Aubaidi
(74) *Attorney, Agent, or Firm* — Hope Baldauff Hartman, LLC

(57) ABSTRACT

Systems and methods for restricting the use and movement of telephone system devices are presented. The system includes an interface configured to allow telephone calls to a limited set of telephone numbers or area codes. The interface may be configured to detect a number during a call attempt and compare the number to a stored sequence list of allowed numbers. If the detected number matches one of the allowed numbers, the call attempt is allowed to continue. However, if the detected number does not match a number in the stored sequence list, the call attempt is blocked. The interface may also be configured to restrict the movement of a cellular telephone based on received location data, configured with a physical lock to prevent removal from a docking station, or configured to generate a locking signal inhibiting use of the telephone after it has been moved greater than the predetermined distance.

18 Claims, 17 Drawing Sheets

U.S. PATENT DOCUMENTS

| | | | |
|---|---|---|---|
| 4,434,461 A | 2/1984 | Puhl | |
| 4,485,486 A | 11/1984 | Webb et al. | |
| 4,486,624 A | 12/1984 | Puhl et al. | |
| 4,528,424 A | 7/1985 | Middleton et al. | |
| 4,549,311 A | 10/1985 | McLaughlin | |
| 4,575,582 A | 3/1986 | Makino | |
| 4,654,655 A | 3/1987 | Kowalski | |
| 4,658,096 A | 4/1987 | West, Jr. et al. | |
| 4,706,274 A | 11/1987 | Baker et al. | |
| 4,734,928 A | 3/1988 | Weiner et al. | |
| 4,737,975 A | 4/1988 | Shafer | |
| 4,737,978 A | 4/1988 | Burke et al. | |
| 4,741,018 A | 4/1988 | Potratz et al. | |
| 4,748,655 A | 5/1988 | Thrower et al. | |
| 4,751,725 A | 6/1988 | Bonta et al. | |
| 4,775,997 A | 10/1988 | West, Jr. et al. | |
| 4,775,998 A | 10/1988 | Felix et al. | |
| 4,775,999 A | 10/1988 | Williams | |
| 4,799,253 A | 1/1989 | Stern et al. | |
| 4,843,621 A | 6/1989 | Potratz | |
| 4,853,951 A | 8/1989 | Bauer | |
| 4,866,762 A * | 9/1989 | Pintar | 379/200 |
| 4,868,519 A | 9/1989 | Shafer | |
| 4,890,315 A | 12/1989 | Bendixen et al. | |
| 4,893,327 A | 1/1990 | Stern et al. | |
| 4,922,486 A | 5/1990 | Lidinsky et al. | |
| 4,922,517 A | 5/1990 | West, Jr. et al. | |
| 5,020,091 A | 5/1991 | Krolopp et al. | |
| 5,020,094 A | 5/1991 | Rash et al. | |
| 5,046,085 A | 9/1991 | Godsey et al. | |
| 5,117,450 A | 5/1992 | Joglekar et al. | |
| 5,134,651 A | 7/1992 | Ortiz et al. | |
| 5,185,779 A | 2/1993 | Dop et al. | |
| 5,222,123 A | 6/1993 | Brown et al. | |
| D339,809 S | 9/1993 | Ron | |
| 5,257,406 A | 10/1993 | Ito et al. | |
| 5,261,121 A | 11/1993 | Hashimoto | |
| 5,287,322 A | 2/1994 | Rastegar | |
| 5,311,477 A | 5/1994 | Rastegar | |
| 5,323,418 A | 6/1994 | Ayerst et al. | |
| 5,329,578 A | 7/1994 | Brennan et al. | |
| 5,361,297 A | 11/1994 | Ortiz et al. | |
| 5,367,558 A | 11/1994 | Gillig et al. | |
| 5,375,258 A | 12/1994 | Gillig | |
| D354,749 S | 1/1995 | Phillips | |
| 5,406,588 A | 4/1995 | Birchler et al. | |
| 5,426,689 A | 6/1995 | Griffith et al. | |
| 5,430,719 A | 7/1995 | Weisser, Jr. | |
| 5,430,761 A | 7/1995 | Bruckert et al. | |
| 5,442,680 A | 8/1995 | Schellinger et al. | |
| 5,444,433 A | 8/1995 | Gropper | |
| 5,444,765 A | 8/1995 | Marui et al. | |
| D362,003 S | 9/1995 | Claudio | |
| 5,469,465 A | 11/1995 | Birchler et al. | |
| 5,469,494 A | 11/1995 | Ortiz Perez et al. | |
| 5,471,670 A | 11/1995 | Hess et al. | |
| 5,475,734 A | 12/1995 | McDonald et al. | |
| 5,475,735 A | 12/1995 | Williams et al. | |
| 5,497,412 A | 3/1996 | Lannen et al. | |
| 5,506,887 A | 4/1996 | Emery et al. | |
| 5,524,061 A | 6/1996 | Mooney et al. | |
| 5,524,137 A | 6/1996 | Rhee | |
| 5,528,666 A | 6/1996 | Weigand et al. | |
| 5,530,736 A | 6/1996 | Comer et al. | |
| 5,533,099 A | 7/1996 | Byrne | |
| 5,544,227 A | 8/1996 | Blust et al. | |
| 5,546,444 A | 8/1996 | Roach, Jr. et al. | |
| 5,548,814 A | 8/1996 | Lorang et al. | |
| 5,564,072 A | 10/1996 | Garcia Aguilera et al. | |
| 5,574,984 A | 11/1996 | Reed et al. | |
| 5,588,041 A | 12/1996 | Meyer, Jr. et al. | |
| 5,594,782 A | 1/1997 | Zicker et al. | |
| 5,596,625 A | 1/1997 | LeBlanc | |
| 5,598,412 A | 1/1997 | Griffith et al. | |
| 5,608,655 A | 3/1997 | Moughanni et al. | |
| 5,610,910 A | 3/1997 | Focsaneanu et al. | |
| 5,611,049 A | 3/1997 | Pitts | |
| 5,613,213 A | 3/1997 | Naddell et al. | |
| 5,629,976 A | 5/1997 | Loke et al. | |
| 5,631,946 A | 5/1997 | Campana et al. | |
| 5,659,698 A | 8/1997 | Weng et al. | |
| 5,666,487 A | 9/1997 | Goodman et al. | |
| 5,668,561 A | 9/1997 | Perrotta et al. | |
| 5,673,304 A | 9/1997 | Connor et al. | |
| 5,675,629 A | 10/1997 | Raffel et al. | |
| 5,689,549 A | 11/1997 | Bertocci et al. | |
| 5,689,803 A | 11/1997 | Tayloe | |
| 5,703,933 A | 12/1997 | Ghisler | |
| 5,706,328 A | 1/1998 | Williman | |
| 5,708,659 A | 1/1998 | Rostoker et al. | |
| 5,715,293 A | 2/1998 | Mahoney | |
| 5,715,296 A | 2/1998 | Schornack et al. | |
| 5,721,732 A | 2/1998 | Emeott et al. | |
| 5,724,656 A | 3/1998 | Vo et al. | |
| 5,742,905 A | 4/1998 | Pepe et al. | |
| 5,751,789 A | 5/1998 | Farris et al. | |
| 5,757,902 A | 5/1998 | Mitsuo | |
| 5,758,281 A | 5/1998 | Emery et al. | |
| 5,764,730 A | 6/1998 | Rabe et al. | |
| 5,771,453 A | 6/1998 | Haartsen | |
| 5,771,459 A | 6/1998 | Demery et al. | |
| 5,774,793 A | 6/1998 | Cooper et al. | |
| 5,774,805 A | 6/1998 | Zicker | |
| 5,774,857 A | 6/1998 | Newlin | |
| 5,790,631 A | 8/1998 | Minarczik et al. | |
| 5,798,694 A | 8/1998 | Reber et al. | |
| 5,801,654 A | 9/1998 | Traylor | |
| 5,802,481 A | 9/1998 | Prieto | |
| 5,812,637 A | 9/1998 | Schornack et al. | |
| 5,818,824 A | 10/1998 | Lu et al. | |
| 5,826,034 A | 10/1998 | Albal | |
| 5,826,193 A | 10/1998 | Ghisler et al. | |
| 5,849,433 A | 12/1998 | Venugopal et al. | |
| 5,859,894 A | 1/1999 | Ortiz Perez et al. | |
| 5,875,395 A | 2/1999 | Holmes | |
| 5,877,821 A | 3/1999 | Newlin et al. | |
| 5,878,096 A | 3/1999 | Shao et al. | |
| 5,884,193 A * | 3/1999 | Kaplan | 455/565 |
| 5,898,679 A | 4/1999 | Brederveld et al. | |
| 5,901,359 A | 5/1999 | Malmstrom | |
| 5,903,832 A | 5/1999 | Seppanen et al. | |
| 5,903,833 A | 5/1999 | Jonsson et al. | |
| 5,905,950 A * | 5/1999 | Anell | 455/421 |
| 5,911,120 A | 6/1999 | Jarett et al. | |
| 5,917,434 A | 6/1999 | Murphy | |
| 5,920,596 A | 7/1999 | Pan et al. | |
| 5,920,815 A | 7/1999 | Akhavan | |
| 5,926,760 A | 7/1999 | Khan et al. | |
| 5,937,058 A | 8/1999 | Bleile et al. | |
| 5,946,384 A | 8/1999 | Yee et al. | |
| 5,946,616 A | 8/1999 | Schornack et al. | |
| 5,949,616 A | 9/1999 | Coon et al. | |
| 5,966,428 A | 10/1999 | Ortiz Perez et al. | |
| 5,970,388 A | 10/1999 | Will | |
| 5,978,469 A | 11/1999 | Benson | |
| 5,982,762 A | 11/1999 | Anzai et al. | |
| 5,982,854 A | 11/1999 | Ehreth | |
| 5,983,117 A | 11/1999 | Sandler et al. | |
| 5,987,100 A | 11/1999 | Fortman et al. | |
| 5,987,678 A | 11/1999 | Ayers | |
| 5,995,839 A | 11/1999 | Coursey et al. | |
| 6,002,937 A | 12/1999 | Young et al. | |
| 6,009,086 A | 12/1999 | Freeburg et al. | |
| 6,014,569 A | 1/2000 | Bottum | |
| 6,016,107 A | 1/2000 | Kampe et al. | |
| 6,016,269 A | 1/2000 | Peterson et al. | |
| 6,018,665 A | 1/2000 | Chavez et al. | |
| 6,026,086 A | 2/2000 | Lancelot et al. | |
| 6,028,984 A | 2/2000 | Kimball | |
| 6,029,072 A | 2/2000 | Barber | |
| 6,031,492 A | 2/2000 | Griffin et al. | |
| 6,035,215 A | 3/2000 | Goni et al. | |
| 6,035,220 A | 3/2000 | Claudio et al. | |
| 6,038,265 A | 3/2000 | Pan et al. | |
| 6,044,148 A | 3/2000 | Bleile | |
| 6,058,106 A | 5/2000 | Cudak et al. | |
| 6,061,439 A | 5/2000 | Bleile et al. | |

| Patent No. | Date | Inventor |
|---|---|---|
| 6,072,828 A | 6/2000 | Chun |
| 6,072,858 A | 6/2000 | Bellin |
| 6,072,862 A | 6/2000 | Srinivasan |
| 6,072,869 A | 6/2000 | Becker et al. |
| 6,075,783 A | 6/2000 | Voit |
| 6,078,805 A | 6/2000 | Scott |
| 6,080,690 A | 6/2000 | Lebby et al. |
| 6,114,053 A | 9/2000 | Matsuyama et al. |
| 6,115,388 A | 9/2000 | Chinitz et al. |
| 6,115,604 A | 9/2000 | Lester et al. |
| 6,116,014 A | 9/2000 | Dalla Betta et al. |
| 6,121,881 A | 9/2000 | Bieback et al. |
| 6,122,515 A | 9/2000 | Ito et al. |
| 6,122,531 A | 9/2000 | Nicholls et al. |
| 6,125,126 A | 9/2000 | Hallenstang |
| 6,134,235 A | 10/2000 | Goldman et al. |
| 6,134,314 A | 10/2000 | Dougherty et al. |
| 6,137,466 A | 10/2000 | Moughanni et al. |
| 6,138,026 A | 10/2000 | Irvin |
| 6,141,341 A | 10/2000 | Jones et al. |
| 6,145,084 A | 11/2000 | Zuili et al. |
| 6,148,069 A | 11/2000 | Ekstrom et al. |
| 6,151,500 A | 11/2000 | Cardina et al. |
| 6,151,620 A | 11/2000 | Madsen et al. |
| 6,157,545 A | 12/2000 | Janninck et al. |
| 6,167,271 A | 12/2000 | Parker et al. |
| 6,167,278 A | 12/2000 | Nilssen |
| 6,169,988 B1 | 1/2001 | Asakura |
| 6,188,888 B1 | 2/2001 | Bartle et al. |
| 6,192,231 B1 | 2/2001 | Chapman et al. |
| 6,198,947 B1 | 3/2001 | Barber |
| 6,203,192 B1 | 3/2001 | Fortman |
| 6,208,627 B1 | 3/2001 | Menon et al. |
| 6,212,396 B1 | 4/2001 | Brown et al. |
| 6,212,550 B1 | 4/2001 | Segur |
| 6,230,031 B1 | 5/2001 | Barber |
| 6,240,277 B1 | 5/2001 | Bright |
| 6,252,867 B1 | 6/2001 | Pfeil et al. |
| 6,253,088 B1 | 6/2001 | Wenk et al. |
| 6,256,489 B1 | 7/2001 | Lichter et al. |
| 6,259,925 B1 | 7/2001 | Josse |
| 6,272,134 B1 | 8/2001 | Bass et al. |
| 6,282,564 B1 | 8/2001 | Smith et al. |
| 6,295,348 B1 | 9/2001 | Bleile et al. |
| 6,301,474 B1 | 10/2001 | Hartmaier et al. |
| 6,314,299 B1 | 11/2001 | Schreib et al. |
| 6,317,064 B1 | 11/2001 | Ferrer et al. |
| 6,324,410 B1 | 11/2001 | Giacopelli et al. |
| 6,330,247 B1 | 12/2001 | Chang et al. |
| 6,331,972 B1 | 12/2001 | Harris et al. |
| 6,333,919 B2 | 12/2001 | Gaffney |
| 6,339,795 B1 | 1/2002 | Narurkar et al. |
| 6,362,778 B2 | 3/2002 | Neher |
| 6,396,413 B2 | 5/2002 | Hines et al. |
| 6,396,457 B1 | 5/2002 | Gatherer et al. |
| 6,405,027 B1 | 6/2002 | Bell |
| 6,411,802 B1 | 6/2002 | Cardina et al. |
| 6,429,811 B1 | 8/2002 | Zhao et al. |
| 6,434,394 B1 | 8/2002 | Grundvig et al. |
| 6,438,215 B1 | 8/2002 | Skladman et al. |
| 6,442,241 B1 | 8/2002 | Tsumpes |
| 6,449,269 B1 | 9/2002 | Edholm |
| 6,453,154 B1 | 9/2002 | Haber et al. |
| 6,459,688 B1 | 10/2002 | Bursztejn et al. |
| 6,459,776 B1 | 10/2002 | Aktas et al. |
| 6,466,783 B2 | 10/2002 | Dahm et al. |
| 6,466,799 B1 | 10/2002 | Torrey et al. |
| 6,470,028 B1 | 10/2002 | Perry et al. |
| 6,470,187 B1 | 10/2002 | Rosen et al. |
| 6,477,362 B1 | 11/2002 | Raith et al. |
| 6,480,714 B1 | 11/2002 | DePani et al. |
| 6,496,693 B1 | 12/2002 | Tran |
| 6,507,589 B1 | 1/2003 | Ramasubramani et al. |
| 6,515,967 B1 | 2/2003 | Wei et al. |
| 6,526,581 B1 | 2/2003 | Edson |
| 6,529,707 B1 | 3/2003 | Dent |
| 6,529,746 B1 | 3/2003 | Kotzin |
| 6,542,497 B1 | 4/2003 | Curry et al. |
| 6,573,938 B1 | 6/2003 | Schulz et al. |
| 6,577,952 B2 | 6/2003 | Geier et al. |
| 6,600,734 B1 | 7/2003 | Gernert et al. |
| 6,615,056 B1 | 9/2003 | Taylor et al. |
| 6,631,120 B1 | 10/2003 | Milbrandt |
| 6,639,917 B1 | 10/2003 | Ellington et al. |
| 6,643,709 B1 | 11/2003 | Kwon |
| 6,690,923 B1 | 2/2004 | Ortiz Perez et al. |
| 6,701,352 B1 | 3/2004 | Gardner et al. |
| 6,704,317 B1 | 3/2004 | Dobson |
| 6,704,580 B1 | 3/2004 | Fintel |
| 6,707,888 B1 | 3/2004 | Cope |
| 6,714,797 B1 | 3/2004 | Rautila |
| D490,063 S | 5/2004 | Miller |
| D490,066 S | 5/2004 | Lytel |
| D490,067 S | 5/2004 | Haney |
| 6,741,835 B2 | 5/2004 | Pulver |
| D490,794 S | 6/2004 | Rathmell |
| D491,159 S | 6/2004 | Lytel |
| 6,757,528 B1 | 6/2004 | Cardina et al. |
| 6,775,522 B2 | 8/2004 | Schornack et al. |
| 6,775,552 B2 | 8/2004 | Link, II |
| 6,778,824 B2 | 8/2004 | Wonak et al. |
| 6,781,481 B2 | 8/2004 | Richardson |
| 6,782,003 B1 | 8/2004 | Giroux et al. |
| 6,785,517 B2 | 8/2004 | Schornack et al. |
| 6,788,953 B1 | 9/2004 | Cheah et al. |
| 6,792,095 B1 | 9/2004 | Frank |
| 6,801,159 B2 | 10/2004 | Swope et al. |
| 6,801,793 B1 | 10/2004 | Aarnio et al. |
| 6,801,934 B1 | 10/2004 | Eranko |
| 6,825,762 B2 | 11/2004 | Giacopelli et al. |
| 6,829,501 B2 | 12/2004 | Nielsen et al. |
| 6,832,082 B1 | 12/2004 | Ramaswamy et al. |
| 6,832,093 B1 | 12/2004 | Ranta |
| 6,865,384 B2 | 3/2005 | Sagi et al. |
| 6,900,772 B2 | 5/2005 | Pulver |
| 6,920,144 B2 | 7/2005 | Niermann |
| 6,920,313 B2 | 7/2005 | Trombatore |
| 6,922,170 B2 | 7/2005 | Alexander, Jr. |
| 6,922,432 B2 | 7/2005 | Callaway, Jr. et al. |
| 6,940,820 B2 | 9/2005 | Fang |
| 6,947,738 B2 | 9/2005 | Skog et al. |
| 6,950,674 B2 | 9/2005 | Jarrett |
| 6,961,330 B1 | 11/2005 | Cattan et al. |
| 6,961,575 B2 | 11/2005 | Stanforth |
| 6,978,141 B2 | 12/2005 | Smith et al. |
| 6,978,154 B1 * | 12/2005 | Ospalak et al. ............... 455/557 |
| 6,981,045 B1 | 12/2005 | Brooks |
| 6,996,396 B1 | 2/2006 | Snapp |
| 7,003,287 B2 | 2/2006 | Roeder |
| 7,032,115 B2 | 4/2006 | Kashani |
| 7,035,633 B2 | 4/2006 | Kirkpatrick |
| 7,073,129 B1 | 7/2006 | Robarts et al. |
| 7,085,566 B1 | 8/2006 | Burchard |
| 7,096,491 B2 | 8/2006 | Cheng |
| 7,097,851 B1 | 8/2006 | Mukuta |
| 7,099,825 B1 | 8/2006 | Cook |
| 7,120,454 B1 | 10/2006 | Frank |
| 7,130,609 B2 | 10/2006 | Cardina et al. |
| 7,130,616 B2 | 10/2006 | Janik |
| 7,133,795 B1 | 11/2006 | Iaciofano et al. |
| 7,136,358 B2 | 11/2006 | Kunito et al. |
| 7,149,514 B1 | 12/2006 | DePani et al. |
| 7,184,768 B2 | 2/2007 | Hind et al. |
| 7,194,083 B1 | 3/2007 | Tischer et al. |
| 7,196,625 B1 | 3/2007 | Nguyen |
| 7,200,424 B2 | 4/2007 | Tischer |
| 7,203,199 B1 | 4/2007 | Duree et al. |
| 7,212,111 B2 | 5/2007 | Tupler et al. |
| 7,218,895 B1 | 5/2007 | Raghavan |
| 7,221,950 B2 | 5/2007 | Frank et al. |
| 7,231,481 B2 | 6/2007 | Scott et al. |
| 7,248,590 B1 | 7/2007 | Liu |
| 7,272,153 B2 | 9/2007 | Cline |
| 7,274,926 B1 | 9/2007 | Laumen et al. |
| 7,274,927 B2 | 9/2007 | Olrik |
| 7,280,817 B2 | 10/2007 | Comp |
| 7,283,519 B2 | 10/2007 | Girard |
| 7,284,147 B2 | 10/2007 | Rao et al. |

| Patent/Publication | Date | Inventor |
|---|---|---|
| 7,289,616 B2 | 10/2007 | Punaganti et al. |
| 7,308,498 B1 | 12/2007 | Olsen et al. |
| 7,315,553 B2 | 1/2008 | Keller-Tuberg et al. |
| 7,318,099 B2 | 1/2008 | Stahl et al. |
| 7,363,034 B2 | 4/2008 | DePani et al. |
| 7,376,386 B2 | 5/2008 | Phillips et al. |
| 7,392,035 B2 | 6/2008 | Rahman et al. |
| 7,440,887 B2 | 10/2008 | Soulet |
| 7,460,510 B2 | 12/2008 | Olivier et al. |
| 7,467,103 B1 | 12/2008 | Murray et al. |
| 7,499,529 B1 | 3/2009 | Kvache et al. |
| 7,522,722 B2 | 4/2009 | Tischer et al. |
| 7,574,523 B2 | 8/2009 | Traversat et al. |
| 7,623,653 B2 | 11/2009 | Tischer et al. |
| 7,630,705 B2 | 12/2009 | Galicia et al. |
| 7,650,415 B1 | 1/2010 | Peterson |
| 2001/0026537 A1 | 10/2001 | Massey |
| 2001/0035459 A1 | 11/2001 | Komai |
| 2001/0037404 A1 | 11/2001 | Hafsteinsson et al. |
| 2001/0040512 A1 | 11/2001 | Hines et al. |
| 2001/0041533 A1 | 11/2001 | Schornack et al. |
| 2001/0049264 A1 | 12/2001 | Balech |
| 2002/0006137 A1 | 1/2002 | Rabenko et al. |
| 2002/0016739 A1 | 2/2002 | Ogasawara |
| 2002/0021669 A1 | 2/2002 | Kunito et al. |
| 2002/0023010 A1 | 2/2002 | Rittmaster et al. |
| 2002/0025832 A1 | 2/2002 | Durian et al. |
| 2002/0027994 A1 | 3/2002 | Katayama et al. |
| 2002/0039892 A1 | 4/2002 | Lindell |
| 2002/0044641 A1 | 4/2002 | Wanner |
| 2002/0045453 A1 | 4/2002 | Juttner et al. |
| 2002/0054667 A1 | 5/2002 | Martinez |
| 2002/0065109 A1 | 5/2002 | Mansikkaniemi et al. |
| 2002/0068544 A1 | 6/2002 | Barzilay et al. |
| 2002/0068558 A1 | 6/2002 | Janik |
| 2002/0073416 A1 | 6/2002 | Catan |
| 2002/0086666 A1 | 7/2002 | Chen |
| 2002/0089998 A1 | 7/2002 | Le |
| 2002/0093948 A1 | 7/2002 | Dertz et al. |
| 2002/0094776 A1 | 7/2002 | Pulver |
| 2002/0098874 A1 | 7/2002 | Zirul et al. |
| 2002/0123359 A1 | 9/2002 | Wei et al. |
| 2002/0137498 A1 | 9/2002 | Goss et al. |
| 2002/0146977 A1 | 10/2002 | Schornack et al. |
| 2002/0151327 A1 | 10/2002 | Levitt |
| 2002/0156626 A1 | 10/2002 | Hutchison |
| 2002/0160748 A1 | 10/2002 | Rahman et al. |
| 2002/0184517 A1 | 12/2002 | Tadayon et al. |
| 2003/0005135 A1 | 1/2003 | Inoue et al. |
| 2003/0006913 A1 | 1/2003 | Joyce et al. |
| 2003/0008680 A1 | 1/2003 | Huh et al. |
| 2003/0041000 A1 | 2/2003 | Zajac et al. |
| 2003/0050062 A1 | 3/2003 | Chen et al. |
| 2003/0060231 A1 | 3/2003 | Bozionek et al. |
| 2003/0063714 A1 | 4/2003 | Stumer et al. |
| 2003/0074672 A1 | 4/2003 | Daniels |
| 2003/0076672 A1 | 4/2003 | Head |
| 2003/0078029 A1 | 4/2003 | Petite |
| 2003/0096600 A1 | 5/2003 | Lewis et al. |
| 2003/0108189 A1 | 6/2003 | Barzani |
| 2003/0125023 A1 | 7/2003 | Fishler |
| 2003/0128115 A1 | 7/2003 | Giacopelli et al. |
| 2003/0134661 A1 | 7/2003 | Rudd et al. |
| 2003/0137991 A1 | 7/2003 | Doshi et al. |
| 2003/0142798 A1 | 7/2003 | Gavette et al. |
| 2003/0145228 A1 | 7/2003 | Suuronen et al. |
| 2003/0156660 A1 | 8/2003 | Zoltowski et al. |
| 2003/0171095 A1 | 9/2003 | Fujinami |
| 2003/0172121 A1 | 9/2003 | Evans et al. |
| 2003/0172218 A1 | 9/2003 | Scott et al. |
| 2003/0190018 A1 | 10/2003 | Bleile et al. |
| 2003/0208651 A1 | 11/2003 | Wurzburg |
| 2003/0216134 A1 | 11/2003 | Motoh |
| 2003/0231594 A1 | 12/2003 | Xu et al. |
| 2003/0235219 A1 | 12/2003 | Kapadia et al. |
| 2003/0236091 A1 | 12/2003 | Wonak et al. |
| 2004/0024660 A1 | 2/2004 | Ganesh et al. |
| 2004/0045096 A1 | 3/2004 | Mani et al. |
| 2004/0067770 A1 | 4/2004 | King et al. |
| 2004/0095316 A1 | 5/2004 | Shibamiya et al. |
| 2004/0132438 A1* | 7/2004 | White ............................ 455/418 |
| 2004/0160372 A1 | 8/2004 | Pulver |
| 2004/0165681 A1 | 8/2004 | Mohan |
| 2004/0174901 A1 | 9/2004 | Ghori et al. |
| 2004/0177310 A1 | 9/2004 | Mohan et al. |
| 2004/0178905 A1 | 9/2004 | Dernier et al. |
| 2004/0203639 A1 | 10/2004 | Ozer et al. |
| 2004/0203705 A1 | 10/2004 | Lundby |
| 2004/0203745 A1 | 10/2004 | Cooper |
| 2004/0203942 A1 | 10/2004 | Dehlin |
| 2004/0205650 A1 | 10/2004 | Cheng |
| 2004/0208119 A1 | 10/2004 | Christodoulou et al. |
| 2004/0214569 A1 | 10/2004 | Cardina et al. |
| 2004/0236999 A1 | 11/2004 | Bezuidenhout |
| 2004/0240647 A1* | 12/2004 | Tiliks et al. .............. 379/114.14 |
| 2004/0252675 A1 | 12/2004 | Lund |
| 2004/0253945 A1 | 12/2004 | Janik |
| 2004/0266418 A1 | 12/2004 | Kotzin |
| 2004/0267535 A1 | 12/2004 | Kotzin |
| 2005/0002407 A1 | 1/2005 | Shaheen et al. |
| 2005/0021818 A1 | 1/2005 | Singhal et al. |
| 2005/0025299 A1 | 2/2005 | Tischer et al. |
| 2005/0025305 A1 | 2/2005 | Tischer et al. |
| 2005/0025308 A1 | 2/2005 | Tischer et al. |
| 2005/0032435 A1 | 2/2005 | Tischer et al. |
| 2005/0032549 A1 | 2/2005 | Kawaguchi |
| 2005/0037751 A1 | 2/2005 | Kim et al. |
| 2005/0043068 A1 | 2/2005 | Shohara et al. |
| 2005/0075093 A1 | 4/2005 | Lei et al. |
| 2005/0099959 A1 | 5/2005 | Standridge |
| 2005/0107109 A1 | 5/2005 | Gunaratnam et al. |
| 2005/0113045 A1 | 5/2005 | Santhoff et al. |
| 2005/0124319 A1 | 6/2005 | Williams et al. |
| 2005/0129224 A1 | 6/2005 | Piket et al. |
| 2005/0129225 A1 | 6/2005 | Piket et al. |
| 2005/0129226 A1 | 6/2005 | Piket et al. |
| 2005/0143016 A1 | 6/2005 | Becker et al. |
| 2005/0143017 A1 | 6/2005 | Lopp et al. |
| 2005/0143149 A1 | 6/2005 | Becker et al. |
| 2005/0143671 A1 | 6/2005 | Hastings et al. |
| 2005/0146431 A1 | 7/2005 | Hastings et al. |
| 2005/0147119 A1 | 7/2005 | Tofano |
| 2005/0148890 A1 | 7/2005 | Hastings |
| 2005/0151640 A1 | 7/2005 | Hastings |
| 2005/0180397 A1 | 8/2005 | Yeom |
| 2005/0191991 A1 | 9/2005 | Owen et al. |
| 2005/0193131 A1 | 9/2005 | Bai et al. |
| 2005/0195855 A1 | 9/2005 | Buskirk et al. |
| 2005/0200492 A1 | 9/2005 | Woodard et al. |
| 2005/0202825 A1 | 9/2005 | Puranik et al. |
| 2005/0232284 A1 | 10/2005 | Karaoguz et al. |
| 2005/0245241 A1 | 11/2005 | Durand et al. |
| 2005/0261970 A1 | 11/2005 | Vucina et al. |
| 2005/0271080 A1 | 12/2005 | Gorman |
| 2005/0282536 A1 | 12/2005 | McClure et al. |
| 2006/0059096 A1 | 3/2006 | Dublish et al. |
| 2006/0078292 A1 | 4/2006 | Huang et al. |
| 2006/0133414 A1 | 6/2006 | Luoma et al. |
| 2006/0143266 A1 | 6/2006 | Ohto et al. |
| 2006/0160571 A1 | 7/2006 | DePani et al. |
| 2006/0167985 A1 | 7/2006 | Albanese et al. |
| 2006/0187956 A1 | 8/2006 | Doviak et al. |
| 2006/0195554 A1 | 8/2006 | Payne et al. |
| 2006/0209745 A1 | 9/2006 | MacMullan et al. |
| 2006/0251115 A1 | 11/2006 | Haque et al. |
| 2007/0014307 A1 | 1/2007 | Srinivasan et al. |
| 2007/0017976 A1 | 1/2007 | Peyret et al. |
| 2007/0054660 A1 | 3/2007 | Cardina et al. |
| 2007/0094279 A1 | 4/2007 | Mittal et al. |
| 2007/0121651 A1 | 5/2007 | Casey et al. |
| 2007/0178900 A1 | 8/2007 | Frank et al. |
| 2007/0268922 A1 | 11/2007 | Dougan et al. |
| 2007/0291921 A1* | 12/2007 | Fleischer et al. .............. 379/229 |
| 2008/0020734 A1 | 1/2008 | Smith et al. |
| 2008/0192768 A1 | 8/2008 | Tischer et al. |
| 2008/0228600 A1 | 9/2008 | Treyz et al. |

| | | | |
|---|---|---|---|
| 2008/0301231 | A1 | 12/2008 | Mehta et al. |
| 2008/0317063 | A1 | 12/2008 | Enzmann et al. |
| 2011/0026436 | A1 | 2/2011 | Karaoguz et al. |

FOREIGN PATENT DOCUMENTS

| | | |
|---|---|---|
| GB | 2 253 119 | 8/1992 |
| GB | 2 283 881 | 5/1995 |
| GB | 2 285 556 | 7/1995 |
| WO | WO 98/28929 | 7/1998 |
| WO | WO 01/58181 | 8/2001 |

OTHER PUBLICATIONS (Spec Sheet) AdvanceTec—AdvanceCommunicator®—Nokia Product Sheet; printed Jan. 2006, 1 page.
(Spec Sheet) AdvanceTec—OEM Services; AdvanceTec—The Company; printed Jan. 2006, 1 page.
(Spec Sheet) Bluetooth Enabled Technology; ELBT595; printed Jan. 2006, 1 page.
(Spec Sheet) Cell Antenna—Introducing CELLDOCK; Mar. 16, 2005, 1 page.
(Spec Sheet) MERGE by Cidco Communications—Merge for Motorola®; Design & Engineering Showcase Honors 2004; printed Jan. 2006, 2 pages.
(Spec Sheet) Motorola SD 4505 System Expansion Cellular Phone Docking Station; page last updated Apr. 12, 2005; 1 page.
(Spec Sheet) RCA 23200RE3—RCA Multi-Handset cell Docking System; Revised Jun. 6, 2005; 2 pages.
AdvanceTec, The AdvanceTec Solution, Cellular Hands-Free Solution: The Pro-Installed Hands Free, printed Jan. 2006, 4 pages.
CellAntenna Corporation: Cellular Antennas, accessories, cellphone products, www.cellantenna.com; CellAntenna Corporation; printed Sep. 26, 2002.
Cellsocket, Welcome to WHP Wireless, www.libretel.net/welcome.html; printed Aug. 17, 2005; 1 page.
CellSocket, www.cellantenna.com/Dockingstations/cellsocket.htm; Cell Antenna Corporation, printed Sep. 26, 2002.
Cellular Docking Station for Nokia Motorola Star Teac and Erickson Cellular Phones, www.cellantenna.com/Dockingstations/dockingstations.htm, CellAntenna Corporation, Sep. 26, 2002.
http://www.hometoys.com/news.php4?section=enchancedview&id=17792169; printed Aug. 17, 2005; 3 pages.
MercuryNews.com, Dock makes cell convenient at home, Jul. 25, 2005, www.timesleader.com/mld/timesleader/business/technology/12216277.htm, printed Aug. 17, 2005; 4 pages.
Motorola, SD4505—Cell phone dock module for SD4500 Series, printed Aug. 17, 2005, pp. 1-2.
PhoneLabs, PhoneLabs Products, printed Aug. 17, 2005, pp. 1-2.
RCA Communications, RCA Cell Docking System 23200RE3, printed Aug. 17, 2005, pp. 1-2.
RCA, Innovative RCA Cell Docking System Allows cell Users to Make and Receive Calls Through a Home Phone, printed Aug. 17, 2005, pp. 1-3.
Telular Corporation, 2004 Annual Report, Making Wireline Replacement a Reality, 76 pages.
Thomson Group, Annual Report, Jun. 3, 2005, pp. 1-180.
Thomson Group, Index to Consolidated Financial Statement, Jun. 3, 2005, F1-F7, 150 pages total.
VOX2 Cellphone Base Station Model No. 131, Vox.Link User Guide, Rev. 1.02., printed Jan. 2006, 1 page.
VOX2 Voxlink Cellphone Docking Station, www.cellantenna.com/Dockingstations/VOX2dockingstation.htm; CellAntenna Corporation, printed Sep. 26, 2002.
U.S. Official Action dated Nov. 9, 2000 in U.S. Appl. No. 09/126,268.
U.S. Official Action dated Jul. 5, 2001 in U.S. Appl. No. 09/126,268.
U.S. Official Action dated Oct. 25, 2000 in U.S. Appl. No. 09/268,591.
U.S. Official Action dated May 1, 2001 in U.S. Appl. No. 09/268,591.
U.S. Official Action dated Jul. 7, 2004 in U.S. Appl. No. 09/999,806.
U.S. Official Action dated Nov. 30, 2005 in U.S. Appl. No. 09/999,806.
U.S. Notice of Allowance / Allowability dated Mar. 23, 2005 in U.S. Appl. No. 09/999,806.
U.S. Notice of Allowance / Allowability dated Apr. 5, 2006 in U.S. Appl. No. 09/999,806.
U.S. Notice of Allowance / Allowability dated Aug. 7, 2006 in U.S. Appl. No. 09/999,806.
U.S. Official Action dated Sep. 23, 2004 in U.S. Appl. No. 10/195,197.
U.S. Official Action dated May 25, 2005 in U.S. Appl. No. 10/195,197.
U.S. Official Action dated Dec. 16, 2005 in U.S. Appl. No. 10/195,197.
U.S. Official Action dated Apr. 28, 2006 in U.S. Appl. No. 10/195,197.
U.S. Notice of Allowance / Allowability dated Jan. 4, 2007 in U.S. Appl. No. 10/195,197.
U.S. Official Action dated Jan. 28, 2004 in U.S. Appl. No. 10/036,206.
U.S. Official Action dated Jul. 19, 2004 in U.S. Appl. No. 10/036,206.
U.S. Official Action dated May 5, 2005 in U.S. Appl. No. 10/036,206.
U.S. Official Action dated Dec. 23, 2005 in U.S. Appl. No. 10/036,206.
U.S. Notice of Allowance / Allowability dated Jan. 4, 2005 in U.S. Appl. No. 10/036,206.
U.S. Notice of Allowance / Allowability dated Sep. 7, 2005 in U.S. Appl. No. 10/036,206.
U.S. Notice of Allowance / Allowability dated Apr. 6, 2006 in U.S. Appl. No. 10/036,206.
U.S. Official Action dated Aug. 15, 2003 in U.S. Appl. No. 10/055,212.
U.S. Notice of Allowance / Allowability dated Jul. 3, 2006 in U.S. Appl. No. 10/851,932.
U.S. Official Action dated Mar. 6, 2008 in U.S. Appl. No. 10/929,317.
U.S. Official Action dated Dec. 9, 2008 in U.S. Appl. No. 10/929,317.
U.S. Notice of Allowance / Allowability dated Aug. 6, 2009 in U.S. Appl. No. 10/929,317.
U.S. Official Action dated Apr. 26, 2006 in U.S. Appl. No. 10/929,711.
U.S. Notice of Allowance / Allowability dated Oct. 30, 2006 in U.S. Appl. No. 10/929,711.
U.S. Official Action dated Mar. 6, 2008 in U.S. Appl. No. 10/929,712.
U.S. Notice of Allowance / Allowability dated Dec. 15, 2008 in U.S. Appl. No. 10/929,712.
U.S. Official Action dated Mar. 5, 2008 in U.S. Appl. No. 10/929,715.
U.S. Official Action dated Jun. 19, 2008 in U.S. Appl. No. 10/929,715.
U.S. Official Action dated Apr. 13, 2009 in U.S. Appl. No. 10/929,715.
U.S. Notice of Allowance / Allowability dated Sep. 23, 2009 in U.S. Appl. No. 10/929,715.
U.S. Official Action dated Nov. 30, 2005 in U.S. Appl. No. 11/048,132.
U.S. Official Action dated Jun. 20, 2006 in U.S. Appl. No. 11/048,132.
U.S. Notice of Allowance /Allowability dated Feb. 23, 2007 in U.S. Appl. No. 11/048,132.
U.S. Official Action dated Apr. 11, 2007 in U.S. Appl. No. 11/322,532.
U.S. Notice of Allowance / Allowability dated Jul. 26, 2007 in U.S. Appl. No. 11/322,532.
U.S. Notice of Allowance / Allowability dated Oct. 23, 2007 in U.S. Appl. No. 11/322,532.
U.S. Official Action dated Oct. 7, 2008 in U.S. Appl. No. 11/323,180.
U.S. Official Action dated May 12, 2009 in U.S. Appl. No. 11/323,180.
U.S. Official Action dated Oct. 1, 2009 in U.S. Appl. No. 11/323,180.
U.S. Official Action dated May 13, 2010 Appl. No. 11/323,180.
U.S. Official Action dated Jan. 23, 2008 in U.S. Appl. No. 11/323,181.
U.S. Official Action dated Sep. 30, 2008 in U.S. Appl. No. 11/323,181.
U.S. Official Action dated Feb. 19, 2009 in U.S. Appl. No. 11/323,181.
U.S. Official Action dated Aug. 20, 2009 in U.S. Appl. No. 11/323,181.

U.S. Official Action dated Jan. 16, 2009 in U.S. Appl. No. 11/323,182.
U.S. Official Action dated Jul. 20, 2009 in U.S. Appl. No. 11/323,182.
U.S. Official Action dated Oct. 30, 2008 in U.S. Appl. No. 11/323,185.
U.S. Official Action dated May 18, 2009 in U.S. Appl. No. 11/323,185.
U.S. Official Action dated Oct. 23, 2009 in U.S. Appl. No. 11/323,185.
U.S. Official Action dated Oct. 15, 2008 in U.S. Appl. No. 11/323,186.
U.S. Official Action dated May 12, 2009 in U.S. Appl. No. 11/323,186.
U.S. Official Action dated Oct. 1, 2009 in U.S. Appl. No. 11/323,186.
U.S. Official Action dated Jan. 21, 2009 in U.S. Appl. No. 11/323,818.
U.S. Official Action dated Sep. 11, 2009 in U.S. Appl. No. 11/323,818.
U.S. Official Action dated Mar. 14, 2008 in U.S. Appl. No. 11/323,820.
U.S. Official Action dated Nov. 17, 2008 in U.S. Appl. No. 11/323,820.
U.S. Official Action dated Apr. 22, 2009 in U.S. Appl. No. 11/323,820.
U.S. Official Action dated Nov. 10, 2009 in U.S. Appl. No. 11/323,820.
U.S. Official Action dated Apr. 16, 2010 in U.S. Appl. No. 11/323,820.
U.S. Official Action dated Apr. 1, 2008 in U.S. Appl. No. 11/323,825.
U.S. Official Action dated Sep. 16, 2008 in U.S. Appl. No. 11/323,825.
U.S. Official Action dated Mar. 5, 2009 in U.S. Appl. No. 11/323,825.
U.S. Official Action dated Jun. 23, 2009 in U.S. Appl. No. 11/323,825.
U.S. Official Action dated Dec. 16, 2009 in U.S. Appl. No. 11/323,825.
U.S. Official Action dated Mar. 17, 2008 in U.S. Appl. No. 11/324,033.
U.S. Official Action dated Dec. 23, 2008 in U.S. Appl. No. 11/324,033.
U.S. Official Action dated Jun. 2, 2009 in U.S. Appl. No. 11/324,033.
U.S. Notice of Allowance / Allowability dated Sep. 18, 2009 in U.S. Appl. No. 11/324,033.
U.S. Official Action dated Mar. 28, 2008 in U.S. Appl. No. 11/324,034.
U.S. Official Action dated Oct. 3, 2008 in U.S. Appl. No. 11/324,034.
U.S. Official Action dated Apr. 14, 2009 in U.S. Appl. No. 11/324,034.
U.S. Official Action dated Nov. 30, 2009 in U.S. Appl. No. 11/324,034.
U.S. Official Action dated Feb. 5, 2009 in U.S. Appl. No. 11/324,149.
U.S. Official Action dated Jul. 22, 2009 in U.S. Appl. No. 11/324,149.
U.S. Official Action dated Mar. 11, 2008 in U.S. Appl. No. 11/324,154.
U.S. Official Action dated Dec. 30, 2008 in U.S. Appl. No. 11/324,154.
U.S. Official Action dated Jul. 9, 2009 in U.S. Appl. No. 11/324,154.
U.S. Official Action dated Oct. 5, 2009 in U.S. Appl. No. 11/324,154.
U.S. Official Action dated May 11, 2010 in U.S. Appl. No. 11/324,154.
U.S. Official Action dated Oct. 15, 2009 in U.S. Appl. No. 11/733,525.
U.S. Official Action dated Apr. 16, 2010 in U.S. Appl. No. 11/733,525.
U.S. Notice of Allowance / Allowability dated Jun. 21, 2002 in U.S. Appl. No. 09/126,268.
U.S. Notice of Allowance / Allowability dated Oct. 23, 2001 in U.S. Appl. No. 09/268,591.
U.S. Official Action dated Jun. 3, 2010 in U.S. Appl. No. 11/323,185.
U.S. Official Action dated Jul. 7, 2010 in U.S. Appl. No. 11/324,034.
U.S. Official Action dated Jul. 7, 2010 in U.S. Appl. No. 12/639,448.
U.S. Notice of Allowance / Allowability dated Feb. 24, 2004 in U.S. Appl. No. 10/055,212.
U.S. Official Action dated Jul. 21, 2010 in U.S. Appl. No. 11/323,186.
U.S. Official Action dated Sep. 14, 2010 in U.S. Appl. No. 12/759,767.
U.S. Official Action dated Sep. 30, 2010 in U.S. Appl. No. 12/874,450.
U.S. Official Action dated Oct. 14, 2010 in U.S. Appl. No. 12/642,288.
U.S. Official Action dated Oct. 29, 2010 in U.S. Appl. No. 12/640,073.
U.S. Official Action dated Nov. 22, 2010 in U.S. Appl. No. 12/639,313.
U.S. Official Action dated Jan. 19, 2011 in U.S. Appl. No. 11/324,034.
Notice of Allowance/Allowability dated Dec. 23, 2010, in U.S. Appl. No. 12/837,785.
U.S. Final Official Action dated Oct. 27, 2010 in U.S. Appl. No. 11/733,525.
U.S. Final Official Action dated Feb. 4, 2011 in U.S. Appl. No. 12/639,448.
U.S. Final Official Action dated Mar. 2, 2011 in U.S. Appl. No. 12/759,767.
U.S. Notice of Allowance dated Mar. 8, 2011 in U.S. Appl. No. 12/639,313.
U.S. Official Action dated Feb. 7, 2011 in U.S. Appl. No. 11/952,510.
U.S. Final Official Action dated Mar. 11, 2011 in U.S. Appl. No. 12/640,073.
U.S. Official Action dated Feb. 4, 2011 in U.S. Appl. No. 12/639,448.
U.S. Notice of Allowance dated Apr. 14, 2011 in U.S. Appl. No. 12/639,313.
U.S. Official Action dated Mar. 21, 2011 in U.S. Appl. No. 12/642,288.
U.S. Notice of Allowance dated Mar. 29, 2011 in U.S. Appl. No. 12/837,785.
U.S. Official Action dated Apr. 13, 2011 in U.S. Appl. No. 12/874,450.
U.S. Notice of Allowance dated May 17, 2011 in U.S. Appl. No. 12/639,448.
U.S. Official Action dated Jun. 17, 2011 in U.S. Appl. No. 12/642,288.
U.S. Office Action dated Aug. 19, 2011 in U.S. Appl. No. 12/909,145.
U.S. Office Action dated Sep. 14, 2011 in U.S. Appl. No. 11/852,510.
U.S. Official Action dated Jan. 30, 2012 in U.S. Appl. No. 11/952,510.
U.S. Notice of Allowance dated Nov. 14, 2011 in U.S. Appl. No. 12/642,288.
U.S. Official Action dated Feb. 3, 2012 in U.S. Appl. No. 12/909,145.
U.S. Official Action dated May 4, 2012 in U.S. Appl. No. 13/089,577
U.S. Official Action dated May 22, 2012 in U.S. Appl. No. 12/874,450.
U.S. Official Action dated Jun. 11, 2012 in U.S. Appl. No. 12/909,145.
U.S. Official Action dated Jun. 26, 2012 in U.S. Appl. No. 12/759,767.

* cited by examiner

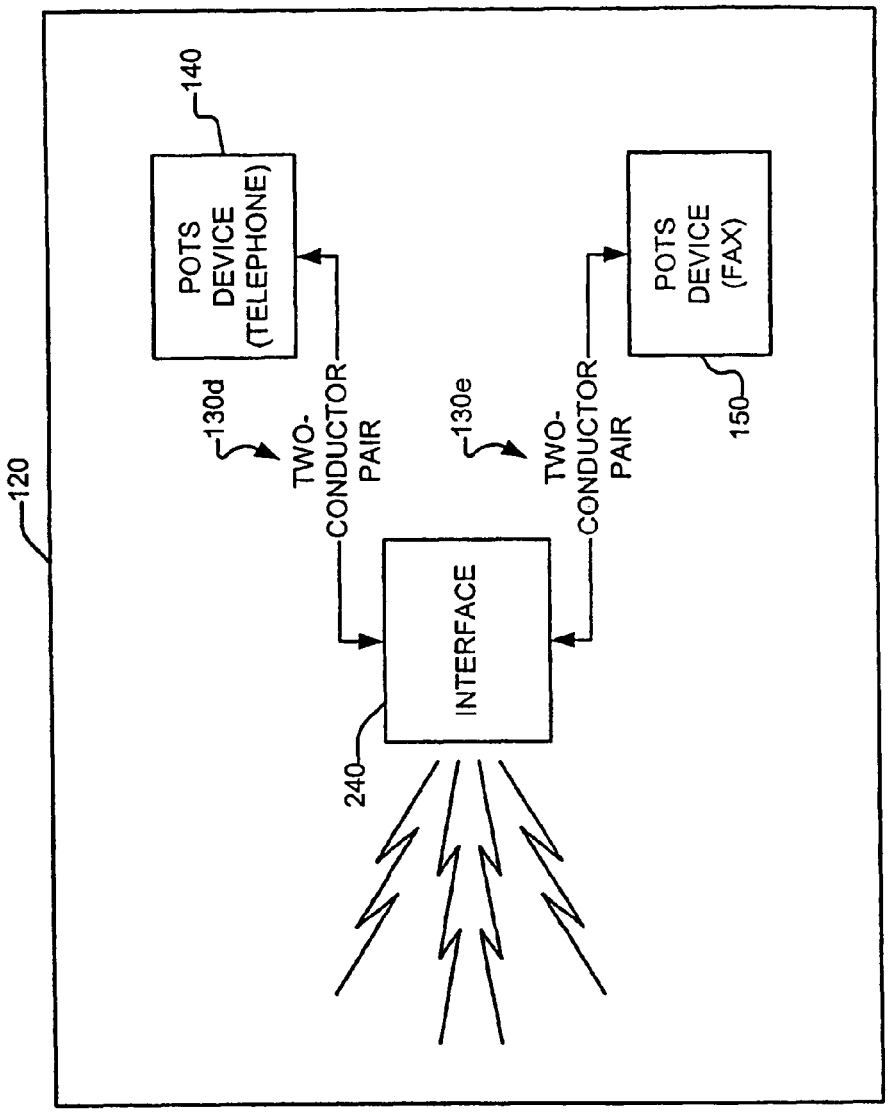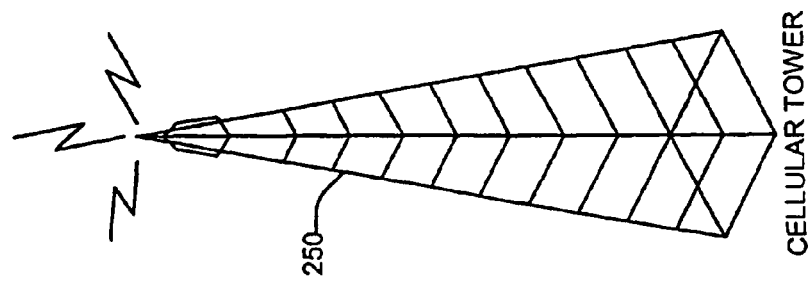
FIG. 2

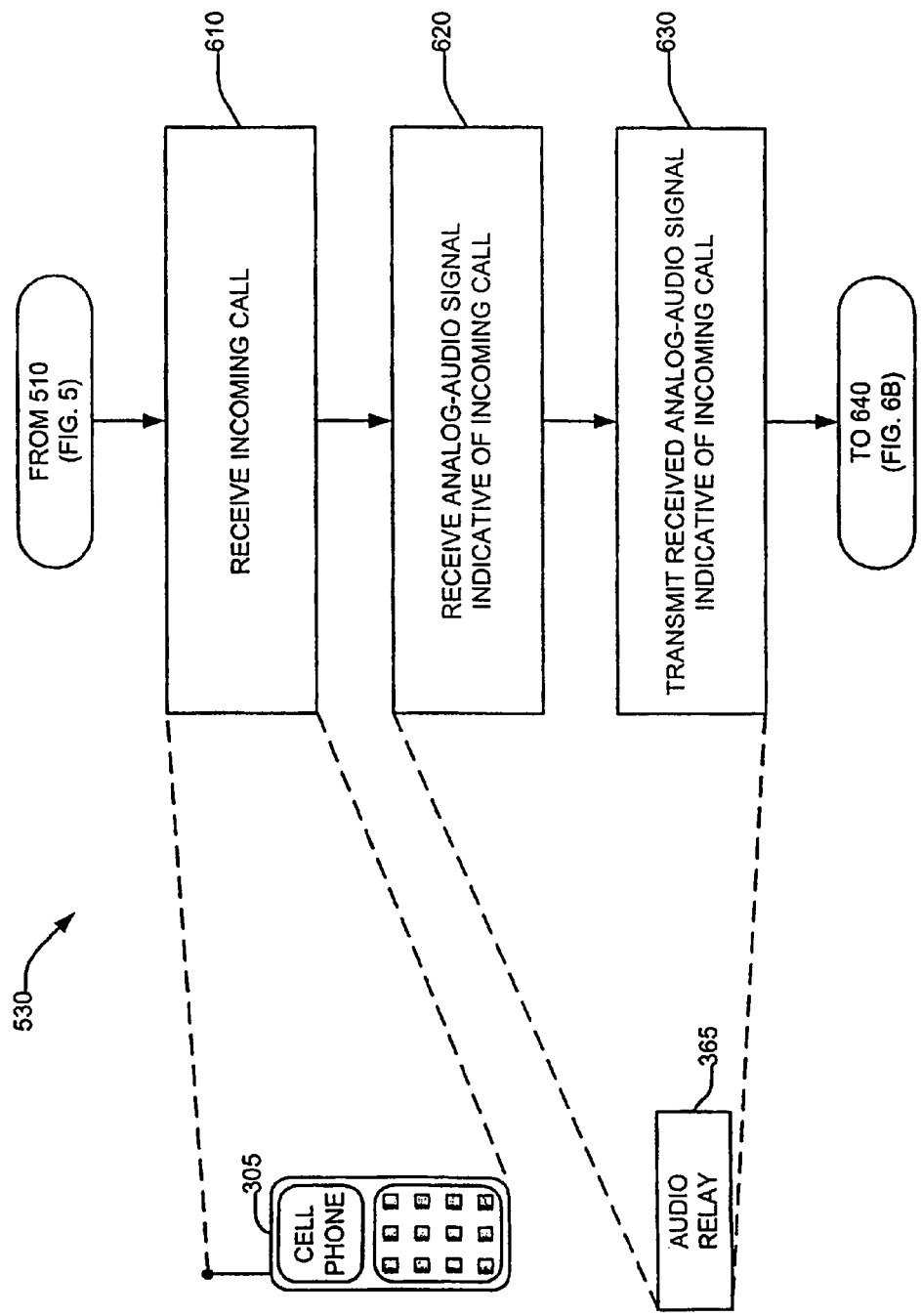

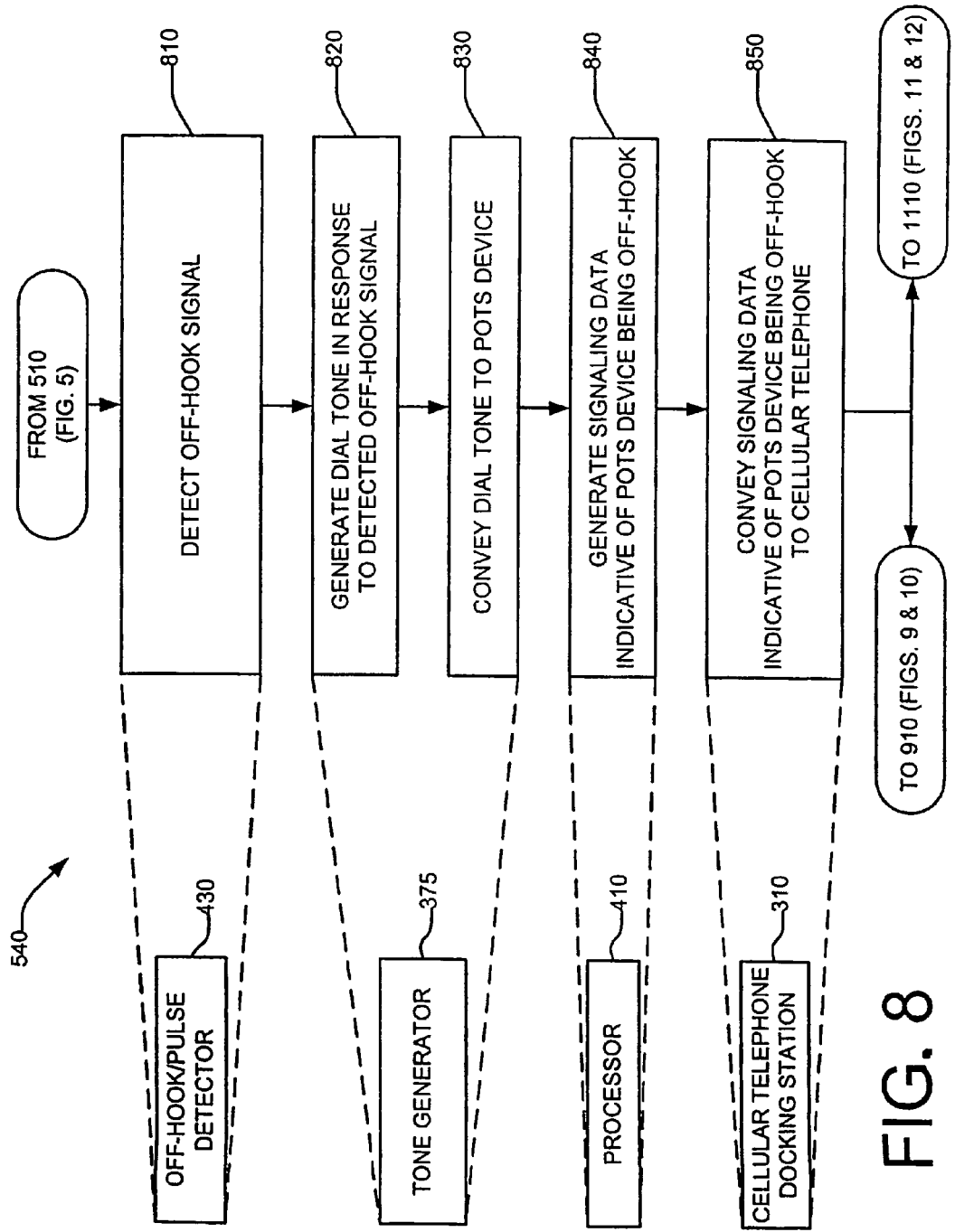

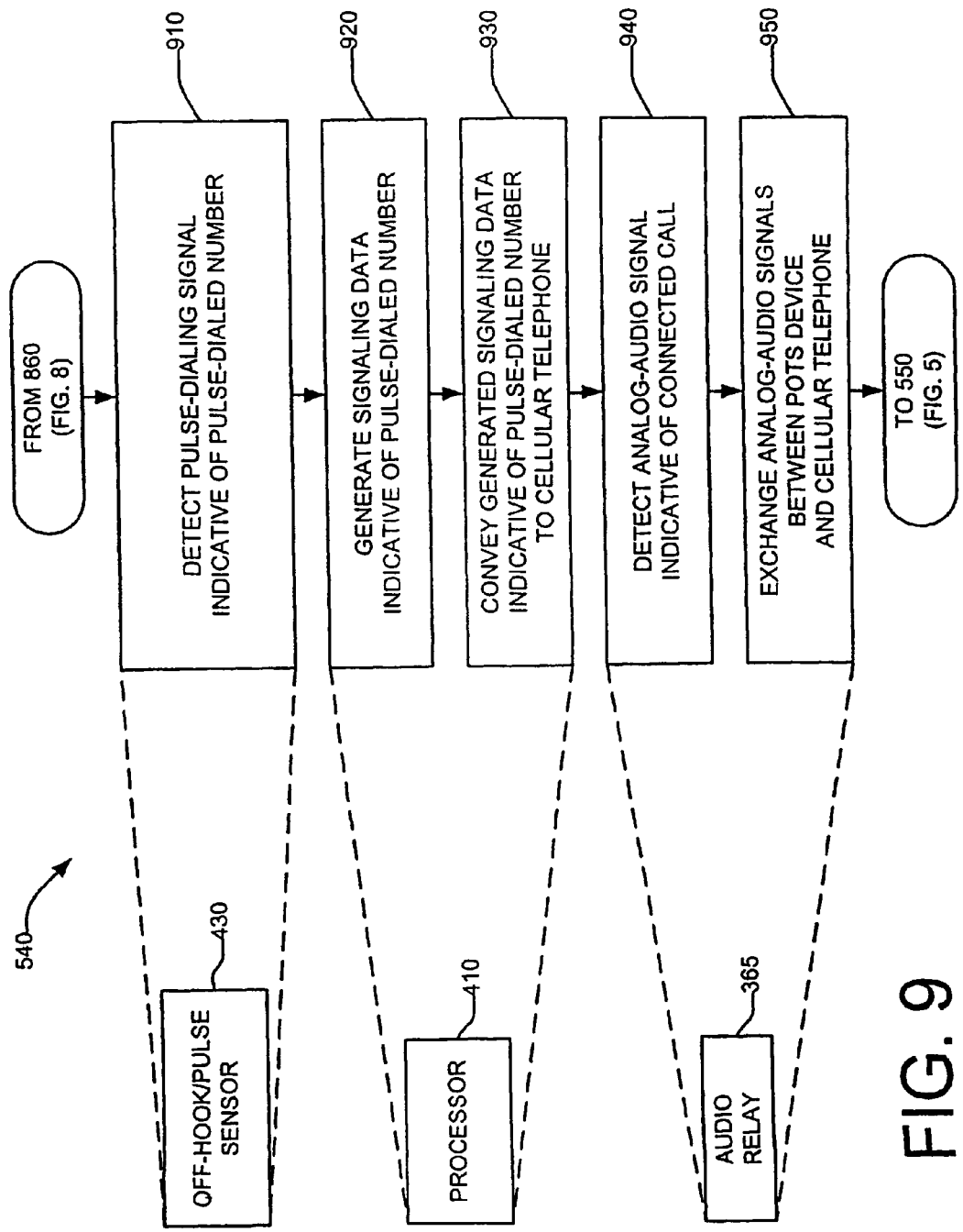

SYSTEMS AND METHODS FOR RESTRICTING THE USE AND MOVEMENT OF TELEPHONY DEVICES

CROSS REFERENCE TO RELATED APPLICATIONS

This patent application is a continuation of U.S. Pat. No. 7,200,424, entitled "Systems and Methods for Restricting the Use and Movement of Telephony Devices," filed Aug. 30, 2004, which is a continuation-in-part of U.S. Pat. No. 7,194,083, entitled "System and Method for Interfacing Plain Old Telephone System (POTS) Devices With Cellular Networks," filed on Jul. 15, 2002, both of which are assigned to the same assignee as this application.

TECHNICAL FIELD OF THE INVENTION

The present invention relates generally to telecommunications and, more particularly, to a system and method for restricting the use and movement of plain old telephone system (POTS) devices and cellular telephones.

BACKGROUND

The telephone has greatly facilitated communications between parties, especially when great distances separate the parties. Metropolitan cities and suburbs typically have sufficient access to a public switched telecommunications/telephone network (PSTN), as well as cellular networks. As access to PSTN and cellular networks has increased, a single subscriber may have several telephony devices, including plain old telephone system (POTS) devices and cellular telephones, available for use by any number of persons in the home. As a result of having multiple telephony devices in the home, many subscribers now find it difficult to simultaneously monitor the use and or location of each telephony device, especially when the subscriber is outside of the home. For example, a babysitter may often find it easy to access one or more telephony devices when the subscriber is away from the home. Thus, subscribers without the ability to restrict the use and access to telephony devices are often confronted with the undesired movement and/or the unauthorized use of these devices.

SUMMARY

A system and method are provided for interfacing plain old telephone system (POTS) devices with cellular networks.

Briefly described, in architecture, one illustrative embodiment, among others, may be seen as a system including an interface configured to only allow telephone calls to a limited set of telephone numbers or area codes. The interface is configured to detect a telephone number during a call and compare the number to a stored sequence list of allowed telephone numbers or area codes. If the detected number matches one of the allowed telephone numbers or area codes, the call attempt is allowed to continue. However, if the detected number does not match a number in the stored sequence list, the call attempt is blocked by the interface.

Another illustrative embodiment, among others, may be seen as a system including an interface configured to restrict the movement of a mobile telephony device. The interface is configured to receive location data, such as global positioning system (GPS data), from the mobile telephony device and generate an alert when the location of the mobile telephony device is greater than a predetermined distance from the interface. The alert may be an audible alarm or, alternatively, the interface may be configured to dial a predetermined telephone number to indicate the unauthorized movement of the mobile telephony device. The interface may also be configured to lock the mobile telephony device to prevent its use upon the device being moved greater than the predetermined distance.

Other systems, methods, features, and advantages will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2 is a block diagram showing one illustrative embodiment of the system for interfacing POTS devices with cellular networks.

FIGS. 6A and 6B are flowcharts showing one illustrative embodiment of the method associated with the conversion of cellular network compatible signals to POTS compatible signals.

FIG. 8 is a flowchart showing several steps associated with the conversion of POTS compatible signals to cellular network compatible signals.

FIGS. 9 through 12 are flowcharts showing several illustrative embodiments of the method associated with the conversion of POTS compatible signals to cellular network compatible signals.

DETAILED DESCRIPTION

Reference will now be made in detail to the description. While several illustrative embodiments of the invention will be described in connection with these drawings, there is no intent to limit it to the illustrative embodiment or illustrative embodiments disclosed therein. On the contrary, the intent is to cover all alternatives, modifications, and equivalents included within the spirit and scope of the invention as defined by the claims.

Figure 1:
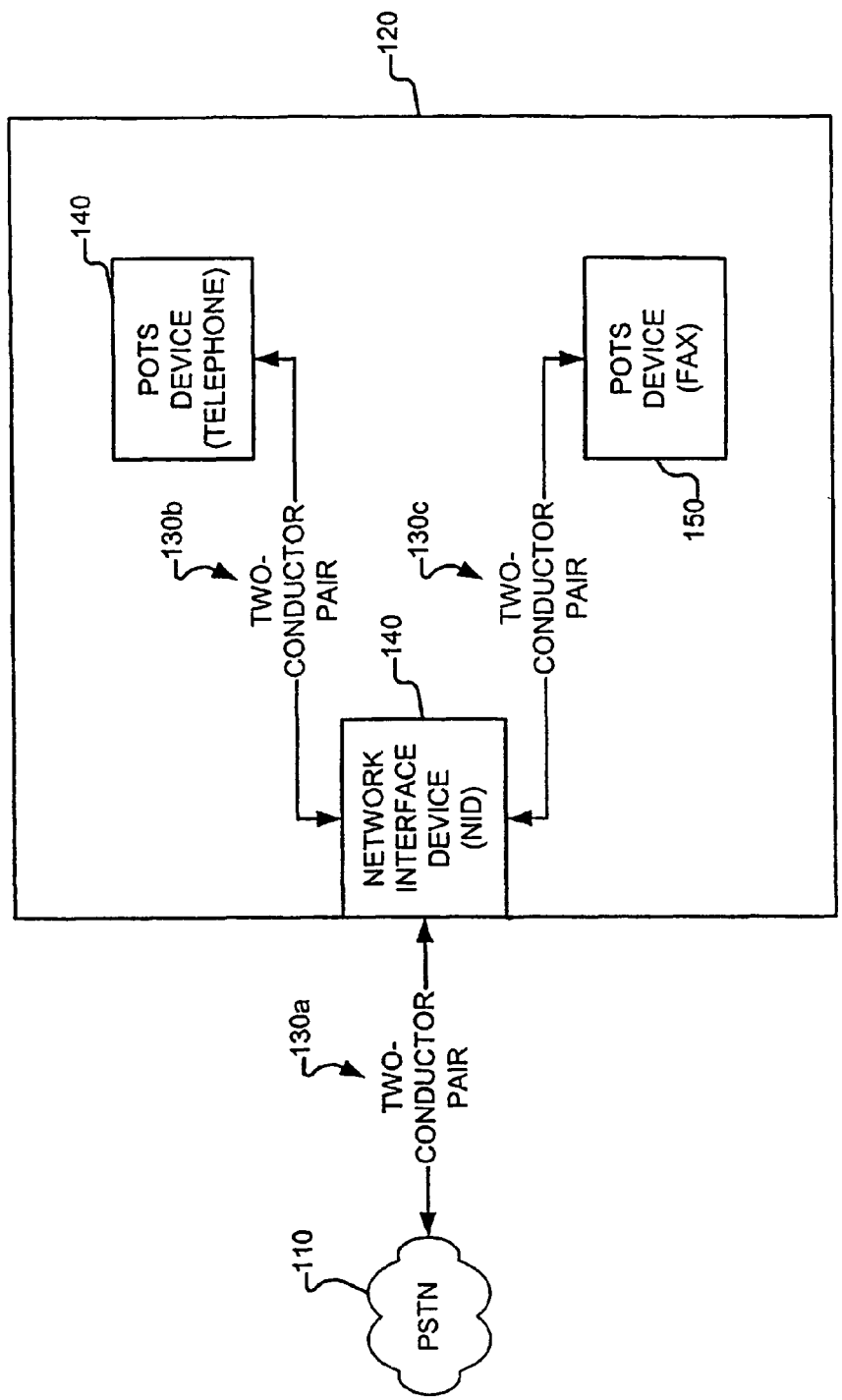
FIG. 1 is a block diagram showing a conventional plain old telephone system (POTS) connection to a telephone company through a network interface device.

FIG. 1 is a block diagram showing a conventional plain old telephone system (POTS) connection to a public switched telephone network (PSTN) 110 through a network interface device (NID) 140. Since such connections are well known, only a cursory discussion is presented here. As shown in FIG. 1, several POTS devices 140, 150 occupy a location 120 (e.g., home, business, etc.). Each POTS device 140, 150 is connected to the NID 140 by two-conductor pair wires 130*b*, 130*c*, also known as POTS pairs, or twisted pairs. The NID 140 serves as the interface between the POTS devices 140, 150 and the PSTN 110, wherein the NID 140 is connected to the PSTN 110 through at least a two-conductor pair 130*a* or landline 130*a*. As evident from FIG. 1, if the landline 130*a* is severed, or if the landline 130*a* is unavailable due to geographical limitations, then the POTS devices 140, 150 within the location 120 have no connection to the PSTN 110.

FIG. 2 is a block diagram showing one illustrative embodiment of a system for interfacing POTS devices 140, 150 with cellular networks. As shown in FIG. 2, one or more POTS devices 140, 150 occupy a location 120. However, unlike FIG. 1, the POTS devices 140, 150 in FIG. 2 are configured to communicate with at least one cellular tower 250 through an interface 240, thereby permitting connection between the POTS devices 140, 150 and a cellular network. In this sense, the POTS devices 140, 150 are connected to the interface 240, rather than an NID 140 (FIG. 1), by two-conductor pair wires 130*d*, 130*e*. Since the interface 240 is a bridge between the POTS devices 140, 150 and the cellular network, the interface 240 is configured to receive POTS compatible signals from the POTS devices 140, 150 and convert the POTS compatible signals to cellular network compatible signals, which are transmitted from the interface 240 to the cellular tower 250. Additionally, the interface 240 is configured to receive cellular network compatible signals from the cellular tower 250 and convert the cellular network compatible signals to POTS compatible signals, which are then forwarded to the POTS devices 140, 150 for use within the location 120. While a specific PSTN network is now shown in FIG. 2, it will be clear to one of ordinary skill in the art that the cellular tower 250 may be connected to a PSTN network, thereby permitting communication with other PSTN devices.

Figure 3:
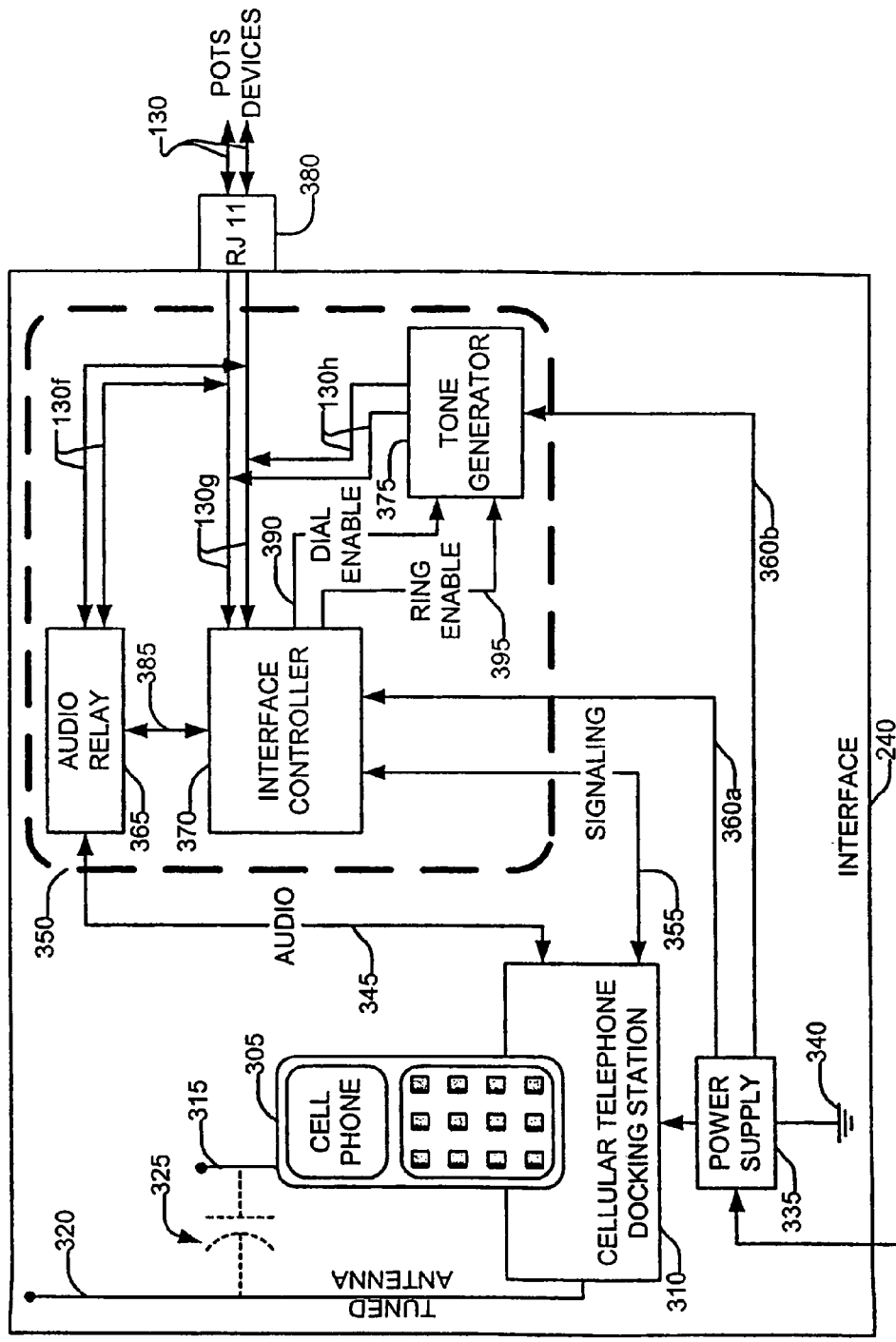
FIG. 3 is a block diagram showing one illustrative embodiment of the interface of FIG. 2.

FIG. 3 is a block diagram showing, in greater detail, a preferred illustrative embodiment of the interface 240 of FIG. 2. In the preferred illustrative embodiment, the cellular network compatible signals are transmitted and received at the interface 240 by a cellular telephone 305 while the POTS compatible signals are transmitted and received at the interface 240 through a POTS connector 380, such as an RJ11 connector 380. Thus, in the preferred illustrative embodiment, the interface 240 comprises a cellular phone docking station 310 that is configured to interface with the cellular telephone 305, thereby establishing a communications link with the cellular telephone 305. The cellular phone docking station 310 may also have a tuned antenna 320 that is configured to improve transmission and reception by the cellular telephone 305, thereby providing a more robust connection to the cellular network through the cellular tower 250 (FIG. 2). The tuned antenna 320 may be coupled to a cellular telephone antenna 315 in a non-destructive, non-contact, or capacitative manner, for example, using capacitive coupling 325, as shown in FIG. 3. In addition to interfacing with a cellular telephone 305 through one of a variety of conventional connectors (not shown), the cellular phone docking station 310 is configured to receive signaling data through signaling line 355, which may include commands associated with outgoing telephone calls. Thus, in one illustrative embodiment, the signaling data on signaling line 355 may be indicative of a telephone number. The received signaling data on signaling line 355 is conveyed to the cellular telephone 305 by the cellular phone docking station 310, thereby permitting control over certain operations of the cellular telephone 305 using the signaling data on signaling line 355. In conveying the signaling data on signaling line 355, the cellular phone docking station 305 may modify the signaling data on signaling line 355 appropriately (e.g., amplify, attenuate, reformat, etc.), or, alternatively, the cellular phone docking station 305 may relay the signaling data on signaling line 355 without modification. Regardless of whether or not the signaling data on signaling line 355 is modified, several aspects of the conveyed signal are discussed below, in greater detail, with reference to other components 350 associated with the interface 240.

In addition to the cellular phone docking station 310, the interface 240 comprises an interface controller 370, an audio relay 365, a tone generator 375, and a power supply 335. The audio relay 365 is configured to exchange analog-audio signals 345 between the POTS devices 140, 150 (FIG. 2) and the cellular phone docking station 310. In this sense, for incoming analog-audio signals 345 (i.e., audio from the cellular telephone 305 to the POTS devices 140, 150 (FIG. 2)), the audio relay 365 receives analog-audio signals 345 from the cellular phone docking station 310 and transmits the analog-audio signals 345 to the POTS devices 140, 150 (FIG. 2) through the POTS connector (e.g., RJ11 connector) 380. Similarly, for outgoing analog-audio signals 345 (i.e., audio from the POTS devices 140, 150 (FIG. 2) to the cellular telephone 305), the analog audio signals 345 are received by the audio relay 365 through the POTS connector 380 and transmitted to the cellular phone docking station 310. Thus, the audio relay 365 provides a bi-directional communication link for the analog-audio signals 345 between the POTS devices 140, 150 (FIG. 2) and the cellular phone docking station 310. In a preferred illustrative embodiment, the audio relay 365 is also configured to either amplify or attenuate the analog-audio signals 345 in response to audio-control signals 385 generated by the interface controller 370. Thus, the behavior of the audio relay 365 is governed by the interface controller 370, which is discussed in greater detail below.

The tone generator 375 is configured to generate certain tones that are used by the POTS devices 140, 150 (FIG. 2). For example, when there is an incoming telephone call, the POTS devices 140, 150 (FIG. 2) "ring" to indicate the presence of the incoming telephone call. The tone generator 375, in such instances, is configured to generate a ring tone, which is then transmitted to the POTS devices 140, 150 (FIG. 2) through the POTS connector 380. The transmitted ring tone indicates to the POTS devices 140, 150 (FIG. 2) that they should "ring," thereby notifying the user of the incoming telephone call. The ring tone is generated in response to a ring enable signal on ring enable line 395, which is discussed below with reference to the interface controller 370.

In another example, when a user picks up a POTS telephone 140 (FIG. 2), a dial-tone is produced at the POTS telephone 140 (FIG. 2). The tone generator 375 is configured to generate the dial tone and transmit the generated dial tone to the POTS telephone 140 (FIG. 2). The dial tone is generated in response to a dial enable signal on dial enable line 390, which is also discussed below with reference to the interface controller 370.

The power supply 335 is configured to provide the components of the interface 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, and any other device in the interface 240 that may be powered by a DC source.

The interface controller 370 is configured to control the behavior of the audio relay 365, the tone generator 375, and the cellular phone docking station 310 during the conversion of POTS compatible signals to cellular network compatible signals, and vice versa. Thus, when an outgoing telephone call is placed by one of the POTS devices 140, 150 (FIG. 2), the interface controller 370 receives the dialed numbers and converts the dialed numbers to a digital command. The digital command is transmitted as signaling data on signaling line 355 from the interface controller 370 to the cellular phone docking station 310, which, in turn, transmits the signaling data on signaling line 355 to the cellular telephone 305. The signaling data, therefore, 355 instructs the cellular telephone 305 to dial the number. In one illustrative embodiment, when the number has been dialed and the called party picks up the phone, the cellular telephone 305 detects the connection and conveys an analog-audio signal 345 to the audio relay 365. In this illustrative embodiment, the audio relay 365 subsequently indicates to the interface controller 370 that the call is connected, and the interface controller 370 generates an audio-control signal 385, thereby enabling bi-directional audio communication of analog-audio signals 345 (i.e., talking between the connected parties) through the audio relay 365. If the party on the POTS telephone 140 (FIG. 2) disconnects (i.e., hangs up the phone), then the disconnect is detected by the interface controller 370 through the POTS connector 380. In this illustrative embodiment, the interface controller 370 generates another audio-control signal 385 in response to the disconnect, thereby disabling the audio relay 365 and terminating the bi-directional audio communication between the POTS telephone 140 (FIG. 2) and the cellular telephone 305. The interface controller 370 further generates, in response to the disconnect, signaling data on signaling line 355, which instructs the cellular telephone 305 to stop transmission and reception. If, on the other hand, the cellular telephone 305 disconnects, then this is detected by the audio relay 365 in one illustrative embodiment. The audio relay 365, in turn, transmits the disconnect information to the interface controller 370, and the interface controller 370 subsequently generates the audio-control signal 385 to disable the audio relay 365.

In another illustrative embodiment, information relating to the connected call is transmitted to the interface controller 370 as signaling data on signaling line 355, rather than as an analog-audio signal 345. In this illustrative embodiment, the cellular telephone 305 generates signaling data on signaling line 355 when the connection is established. The signaling data on signaling line 355 is received by the interface controller 370, which generates an audio-control signal 385 in response to the received signaling data on signaling line 355. The audio-control signal 385 enables the audio relay 365, thereby permitting bi-directional audio communication between the POTS telephone 140 (FIG. 2) and the cellular telephone 305. If the party on the POTS telephone 140 (FIG. 2) disconnects (i.e., hangs up the phone), then the disconnect is detected by the interface controller 370 through the POTS connector 380. The interface controller 370 subsequently generates an audio-control signal 385 to disable the audio relay 365, thereby terminating the bi-directional audio communication between the POTS telephone 140 (FIG. 2) and the cellular telephone 305. If, however, the cellular telephone 305 disconnects, then the cellular telephone 305, in this illustrative embodiment, generates signaling data on signaling line 355 indicative of the disconnected call. The generated signaling data on signaling line 355 is transmitted to the interface controller 370, which subsequently generates an audio-control signal 385 to disable the audio relay 365.

In the case of an incoming telephone call, the cellular telephone 305 detects the incoming telephone call and conveys this information to the interface controller 370. In one illustrative embodiment, the information is conveyed to the interface controller 370 through the audio relay 365. Thus, in this illustrative embodiment, the incoming telephone call generates an analog-audio signal 345 at the cellular telephone 305. The analog-audio signal 345 is transmitted from the cellular telephone 305 to the audio relay 365 through the cellular phone docking station 310, and the audio relay 365 then indicates to the interface controller 370 that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The ring tone makes the POTS devices 140, 150 (FIG. 2) "ring." When one of the POTS device 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

In another illustrative embodiment, the information is conveyed to the interface controller 370 through signaling data on signaling line 355. Thus, in this illustrative embodiment, when the cellular telephone 305 detects an incoming telephone call, it generates signaling data on signaling line 355. The signaling data on signaling line 355 is transmitted to the interface controller 370, thereby indicating that there is an incoming call. The interface controller 370 receives this information and generates a ring enable signal on ring enable line 395. The ring enable signal on ring enable line 395 is received by the tone generator 375, which generates the ring tone in response to the ring enable signal on ring enable line 395. The tone makes the POTS devices 140, 150 (FIG. 2) "ring." When one of the POTS devices 140, 150 (FIG. 2) is picked up and a connection is established, the interface controller 370 detects the established call and generates signaling data on signaling line 355, which indicates to the cellular telephone 305 that the connection is established. Additionally, the interface controller 370 generates an audio-control signal 385, which enables the audio relay 365 for bi-directional audio communication between the POTS device 140, 150 (FIG. 2) and the cellular telephone 305. When the call ends, the system disconnects as described above.

Figure 4:
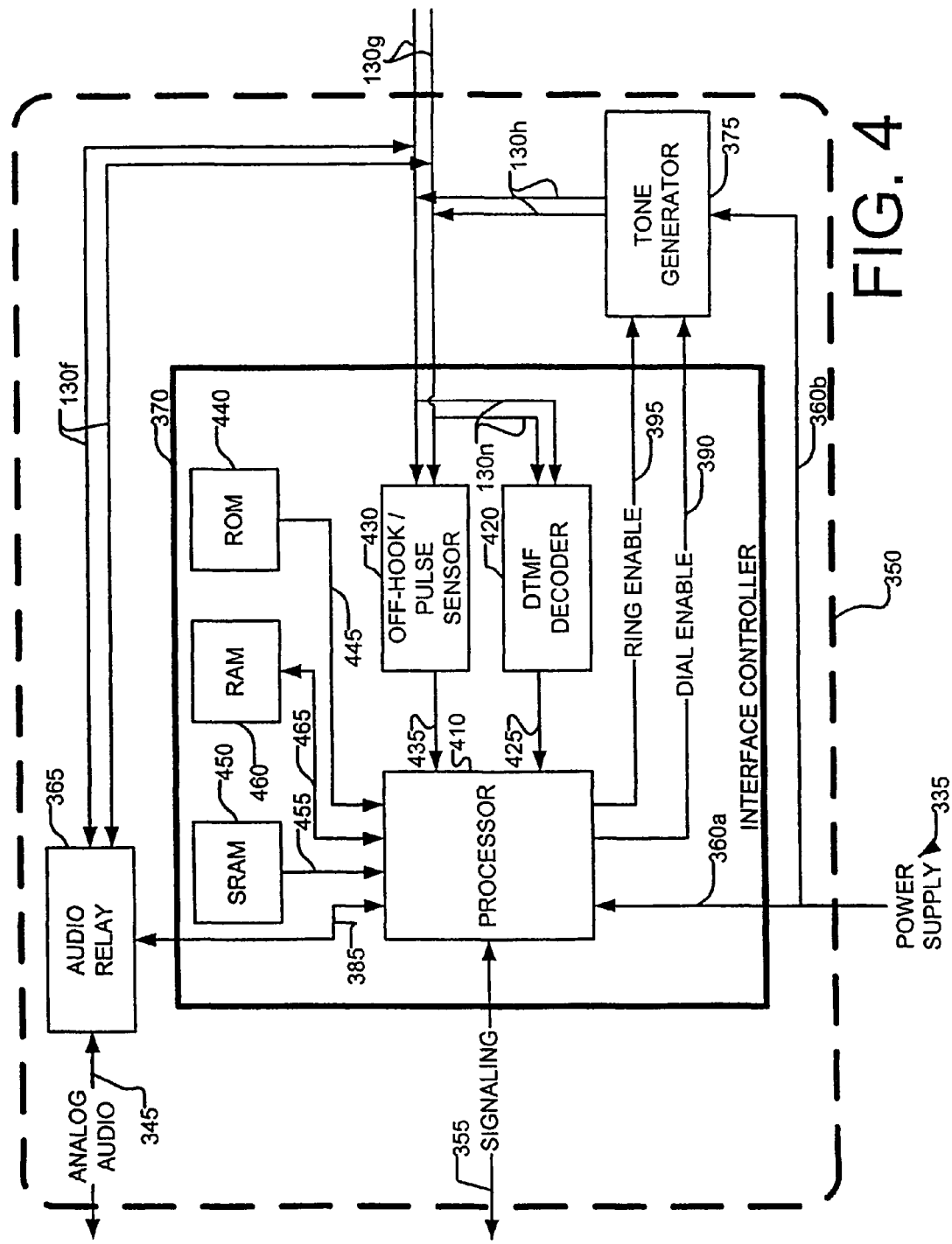
FIG. 4 is a block diagram showing one illustrative embodiment of the hardware within the interface of FIG. 3.

FIG. 4 is a block diagram showing the interface controller 370 of FIG. 3 in greater detail. The interface controller 370 is shown in FIG. 4 as comprising a processor 410, random-access memory (RAM) 460, read-only memory (ROM) 440, static-random-access memory (SRAM) 450, an off-hook/pulse sensor 430, and a dual-tone multi-frequency (DTMF) decoder 420. The ROM 440 is configured to store the instructions that run the interface controller 370. In this sense, the ROM 440 is configured to store the program that controls the behavior of the interface controller 370, thereby allowing the interface controller 370 to convert POTS compatible signals to cellular network compatible signals, and vice versa. The SRAM 450 is adapted to store configuration information, such as whether the system is amenable to 10-digit dialing or 7-digit dialing, international calling protocols, etc. Thus, the SRAM 450 may be adapted differently for systems that are used in different geographical areas, or systems that use different calling protocols. The RAM 460 is configured to store temporary data during the running of the program by the processor 410. The processor is configured to control the operation of the off-hook/pulse sensor 430, the DTMF decoder 420, the tone generator 375, and the audio relay 365 in accordance with the instructions stored in ROM 440. Additionally, the processor 410 is configured to generate signaling data on signaling line 355, which may instruct the cellular telephone 305 (FIG. 3) to dial a number, disconnect a call, etc. Several of these functions are discussed in detail below with reference to the off-hook/pulse sensor 430 and the DTMF decoder 420.

The off-hook/pulse sensor 430 is configured to detect when any of the POTS devices 140, 150 (FIG. 2) are off-hook and generate an off-hook signal 435 when a POTS device 140, 150 (FIG. 2) is detected as being off-hook. In this sense, the off-hook/pulse sensor 430 is connected to the POTS connector 380 (FIG. 3) through the two-conductor pair wires 130g. Thus, when any of the POTS devices 140, 150 (FIG. 2) connected to the two-conductor pair 130 go off-hook, the off-hook is detected by the off-hook/pulse sensor 430, which is also connected to the two-conductor pair 130. The off-hook/pulse sensor 430 generates an off-hook signal 435 after detecting that a POTS device 140, 150 (FIG. 2) is off-hook, and subsequently transmits the off-hook signal 435 to the processor 410. If the POTS device 140, 150 (FIG. 2) is receiving an incoming call, then the off-hook signal 435 indicates that the POTS device 140, 150 (FIG. 2) has "picked up" the incoming call, thereby alerting the processor 410 that the processor 410 should establish a bi-directional audio connection between the cellular telephone 305 (FIG. 3) and the POTS device 140, 150 (FIG. 2). If, on the other hand, the POTS device 140, 150 (FIG. 2) is placing an outgoing call, then the off-hook signal 435 alerts the processor 410 that a phone number will soon follow. In either event, the off-hook/pulse sensor 430 transmits the off-hook signal 435 to the processor 410, which, in turn, generates signaling data on signaling line 355 indicative of the POTS device 140, 150 (FIG. 2) being off-hook. The signaling data on signaling line 355 is then conveyed, either with or without modification, to the cellular telephone 305 through the cellular phone docking station 310.

The off-hook/pulse sensor 430 is further configured to detect dialing from POTS devices 140, 150 (FIG. 2) that are configured for pulse dialing. Since pulse dialing emulates rapid sequential off-hook signals, the off-hook/pulse sensor 430 receives pulses (i.e., the rapid sequential off-hook signals) and produces a sequence of off-hook signals 435 or pulse-dialing signals. The sequence of off-hook signals 435 is relayed to the processor 410, which converts the sequence of off-hook signals into signaling data on signaling line 355 that is indicative of the dialed number. The signaling data on signaling line 355 is transmitted from the processor 410 to the cellular telephone 305 through the cellular phone docking station 310. The cellular telephone 305, after receiving the signaling data on signaling line 355, dials the number indicated by the signaling data on signaling line 355, thereby permitting phone calls by the POTS devices 140, 150 (FIG. 2) through the cellular network. In one illustrative embodiment, the numbers dialed by the POTS devices 140, 150 (FIG. 2) are stored in RAM 460, and, once a predetermined number of dialed numbers has been stored, the processor 410 conveys the stored numbers and a "send" command to the cellular telephone. In other words, upon receiving enough digits to dial a telephone number, as indicated by the configuration information in SRAM 450, the processor 410 commands the cellular telephone 305 to dial the outgoing number, thereby connecting a call from the POTS device 140, 150 (FIG. 2) through the cellular network. In another illustrative embodiment, the RAM stores numbers as they are dialed by the POTS devices 140, 150 (FIG. 2). If, during dialing, the processor 410 detects a delay or a pause, then the processor 410 presumes that all of the digits of the telephone number have been dialed. Thus, the processor 410 commands the cellular telephone 305 to dial the outgoing number, thereby connecting the call from the POTS device 140, 150 (FIG. 2) through the cellular network.

The DTMF decoder 420 is configured to detect dialing from POTS devices 140, 150 (FIG. 2) that are configured for DTMF or "tone" dialing. The DTMF decoder 420 receives a tone, which represent a number, through the two-conductor pair 130n. After receiving the tone, the DTMF decoder 420 generates a DTMF-dialing signal 425 that is indicative of the number that was dialed. The DTMF-dialing signal 425 is then transmitted to the processor 410, which converts the DTMF-dialing signal 425 into signaling data on signaling line 355 that is indicative of the number that was dialed. The signaling data on signaling line 355 is transmitted from the processor 410 to the cellular telephone 305 through the cellular phone docking station 310. The cellular telephone 305 subsequently dials the number indicated by the signaling data on signaling line 355, thereby allowing the POTS device 140, 150 (FIG. 2) to make a call using the cellular network.

It can be seen, from FIGS. 2 through 4, that the various illustrative embodiments of the system will permit the interfacing of POTS devices 140, 150 (FIG. 2) with a cellular network. Specifically, in one illustrative embodiment, POTS devices 140, 150 (FIG. 2) are interfaced with the cellular network through a cellular telephone 305 (FIG. 3), which is attached to the interface 240 at a cellular phone docking station 310. In addition to the various systems, as described above, another illustrative embodiment of the invention may be seen as a method for interfacing POTS devices 140, 150 (FIG. 2) with cellular networks. Several illustrative embodiments of the method are described with reference to FIGS. 5 through 12 below.

Figure 5:
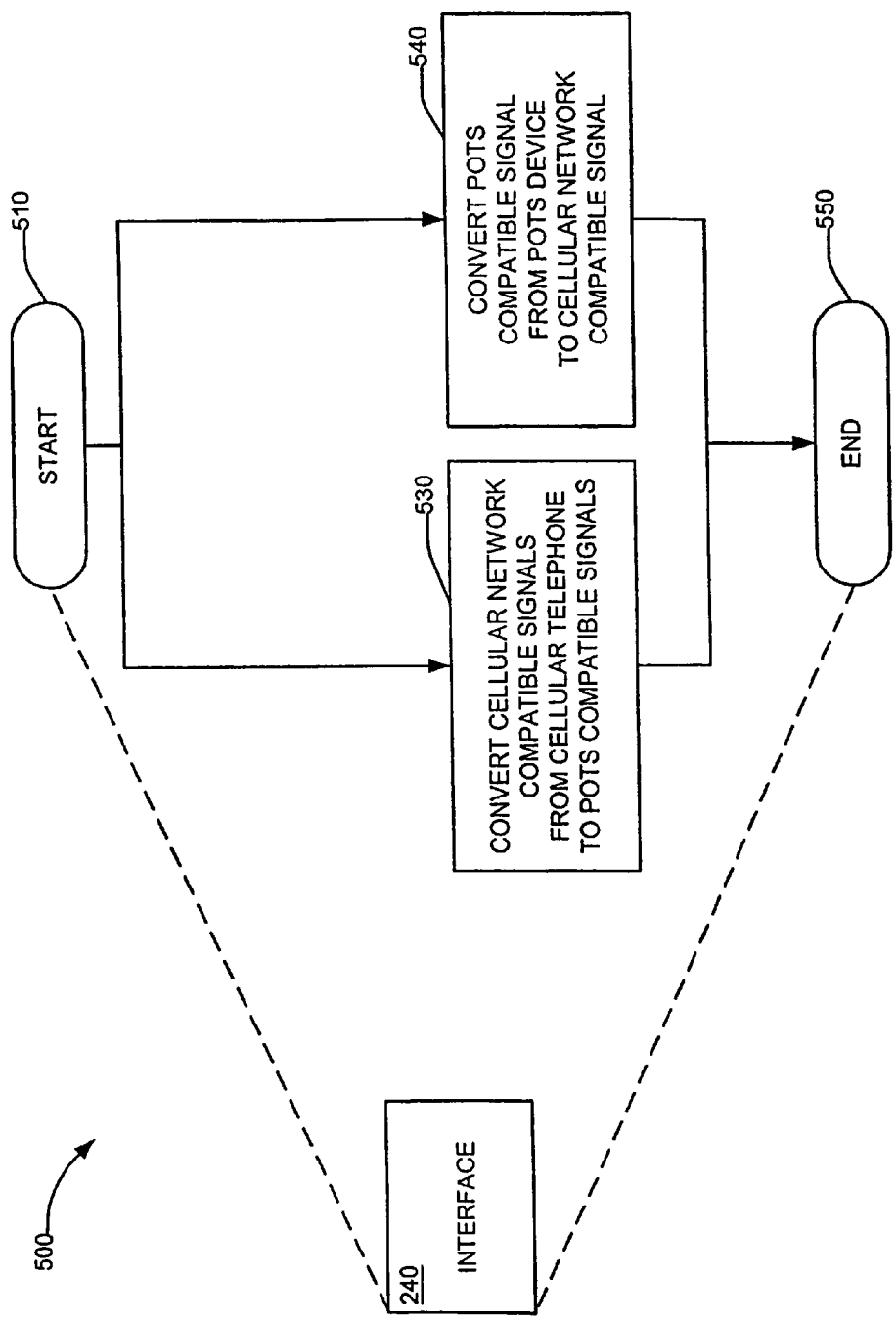
FIG. 5 is a flowchart showing one illustrative embodiment of the method for interfacing POTS devices with cellular networks.

FIG. 5 is a flowchart showing one illustrative embodiment of the method for interfacing POTS devices with cellular networks. In a broad sense, once a POTS device 140, 150 (FIG. 2) has been coupled to a cellular telephone 305 (FIG. 3) through an interface 240 (FIG. 2), this illustrative embodiment may be seen as converting, in step 530, cellular network compatible signals from the cellular telephone 305 (FIG. 3) to POTS compatible signals, and converting, in step 540, POTS compatible signals from the POTS devices 140, 150 (FIG. 2) to cellular network compatible signals. In a preferred illustrative embodiment, the converting steps 530, 540 are performed at the interface 240.

Figure 6B:
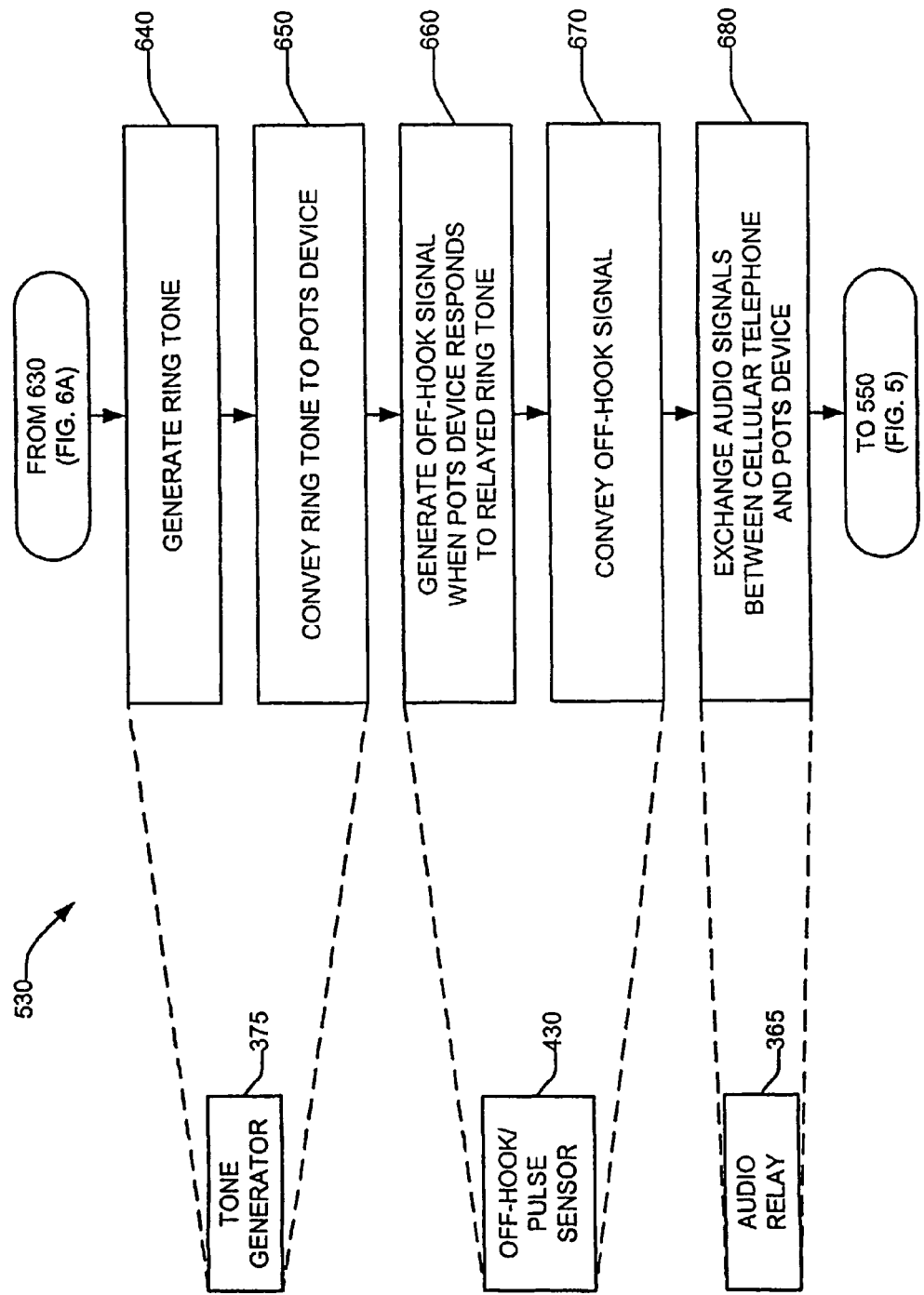

FIGS. 6A and 6B are flowcharts showing one illustrative embodiment of the method associated with the conversion 530 of cellular network compatible signals to POTS compatible signals. As an initial matter, the cellular network compatible signals are received through the cellular telephone 305 (FIG. 3). Thus, in step 610, the system receives an incoming call through the cellular telephone 305 (FIG. 3). Once the incoming call is received 610, the system further receives, in step 620, an analog-audio signal 345 (FIG. 3) indicative of the incoming call from the cellular telephone 305 (FIG. 3). The received analog-audio signal 345 (FIG. 3) is then transmitted, in step 630, to an interface controller 370 (FIG. 3). The interface controller 370 (FIG. 3) generates, in step 640, a ring tone in response to receiving the analog-audio signal 345 (FIG. 3). In a preferred illustrative embodiment, the ring tone is generated 640 by a tone generator 375 (FIG. 3). The generated 640 ring tone is conveyed, in step 650, to the POTS devices 140, 150 (FIG. 2), and, when the POTS device 140, 150 (FIG. 2) is "picked up," an off-hook signal is generated, in step 660, and conveyed, in step 670, to the interface controller 370 (FIG. 3). This triggers the interface controller 370 (FIG. 3) to activate the audio relay 365 (FIG. 3), and analog-audio signals 345 (FIG. 3) are exchanged, in step 680, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

Figure 7A:
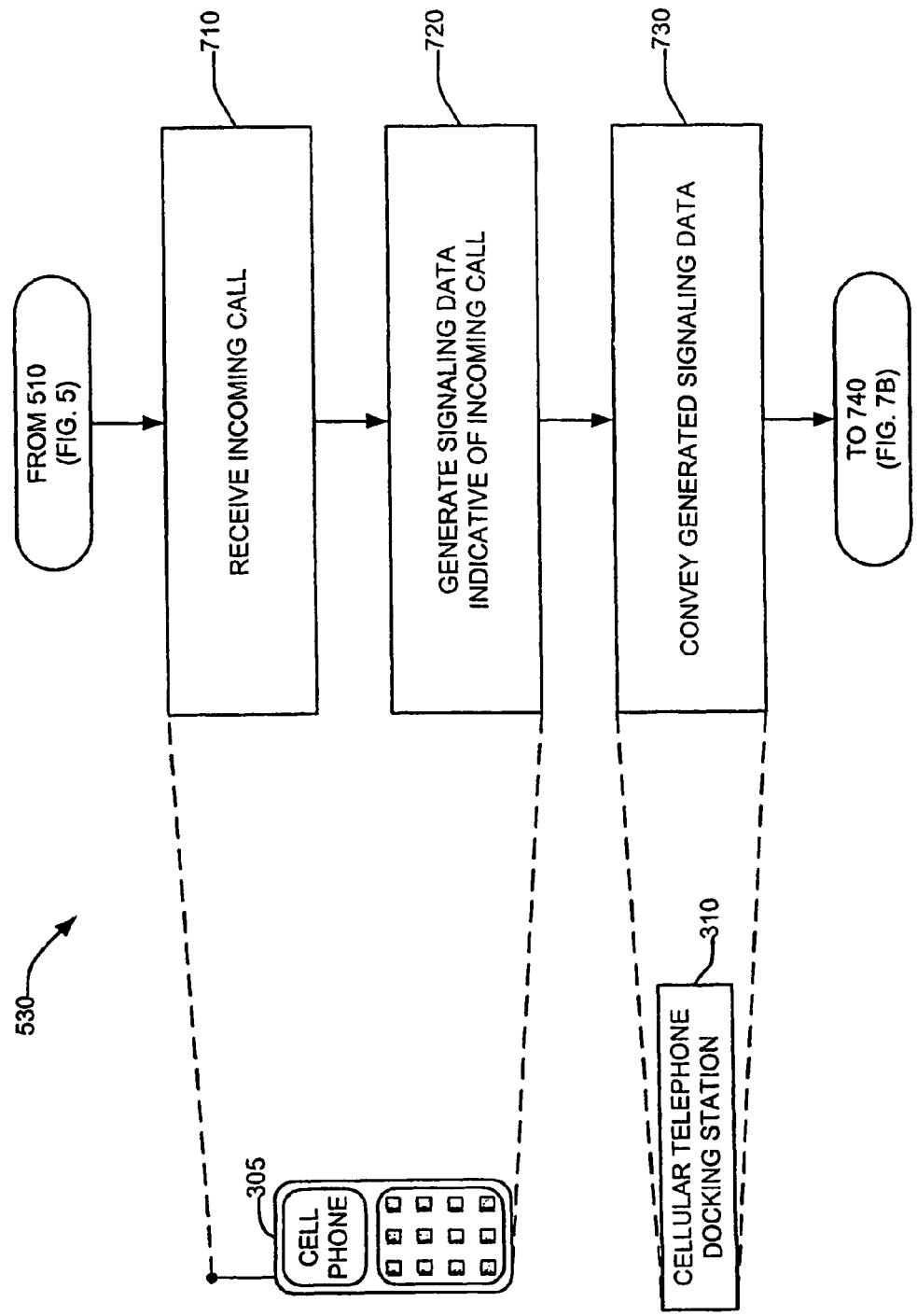
FIGS. 7A and 7B are flowcharts showing another illustrative embodiment of the method associated with the conversion of cellular network compatible signals to POTS compatible signals.
Figure 7B:
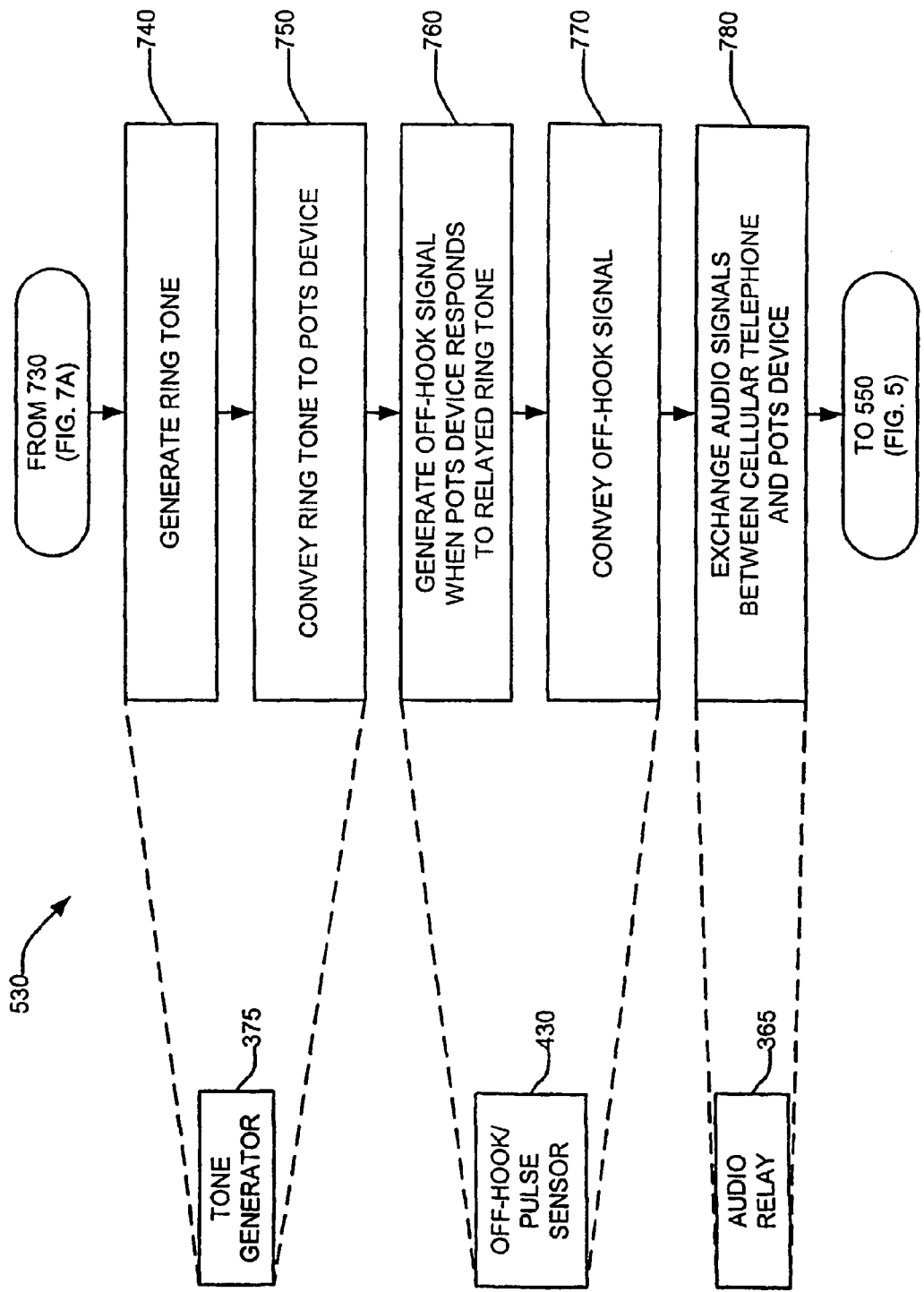

FIGS. 7A and 7B are flowcharts showing another illustrative embodiment of the method associated with the conversion 530 of cellular network compatible signals to POTS compatible signals. Similar to FIGS. 7A and 7B, the cellular network compatible signals here are received through the cellular telephone 305 (FIG. 3). Thus, in step 710, the system receives an incoming call through the cellular telephone 305 (FIG. 3). However, unlike the illustrative embodiment of FIGS. 6A and 6B, once the incoming call is received 710, the system generates, in step 720, signaling data on signaling line 355 (FIG. 3) indicative of the incoming call from the cellular telephone 305 (FIG. 3). The generated 720 signaling data on signaling line 355 (FIG. 3) is then conveyed, in step 730, to an interface controller 370 (FIG. 3). The interface controller 370 (FIG. 3) generates, in step 740, a ring tone in response to signaling data on signaling line 355 (FIG. 3). In a preferred illustrative embodiment, the ring tone is generated 740 by a tone generator 375 (FIG. 3). The generated 740 ring tone is conveyed, in step 750, to the POTS devices 140, 150 (FIG. 2), and, when the POTS device 140, 150 (FIG. 2) is "picked up," an off-hook signal is generated, in step 760, and conveyed, in step 770, to the interface controller 370 (FIG. 3). This triggers the interface controller 370 (FIG. 3) to activate the audio relay 365 (FIG. 3), and analog-audio signals 345 (FIG. 3) are exchanged, in step 780, between the POTS devices 140, 150 (FIG. 2) and the cellular telephone 305 (FIG. 3) through the audio relay 365 (FIG. 3). Thus, in this illustrative embodiment, once the incoming call is connected between the cellular telephone 305 (FIG. 3) and the POTS device 140, 150 (FIG. 2), the POTS device 140, 150 (FIG. 2) freely communicates through the cellular network.

FIG. 8 is a flowchart showing several steps associated with the conversion 540 of POTS compatible signals to cellular network compatible signals. As described above, the interface 240 (FIG. 2) is configured to allow outgoing calls using either pulse-dialing or "tone" dialing. The method steps associated with pulse-dialing are different from the method steps associated with "tone" dialing. However, regardless of which type of dialing is employed, both methods share several of the initial steps. FIG. 8 describes the shared initial steps associated with an outgoing call from a POTS device 140, 150 (FIG. 2) through the cellular network. When a user "picks up" the phone 140 (FIG. 2) to place an outgoing call, the system detects, in step 810, an off-hook signal at the off-hook/pulse detector 430 (FIG. 4). The system then generates, in step 820, a dial tone in response to the detected off-hook signal. In an illustrative embodiment, the dial tone is generated 820 by the tone generator 375 (FIG. 3). The generated 820 dial tone is conveyed, in step 830, to the POTS device 140, 150 (FIG. 2) (i.e., to the person that is placing the outgoing call) to indicate that the system is ready for dialing. In addition to generating 820 the dial tone, the system further generates, in step 840, signaling data on signaling line 355 (FIG. 3) that is indicative of the POTS device 140, 150 (FIG. 2) being off-hook. The generated 840 signaling data on signaling line 355 (FIG. 3) is then conveyed, in step 850, to the cellular telephone 305 (FIG. 3), either with or without modification, through the cellular phone docking station 310 (FIG. 3), thereby indicating to the cellular telephone 305 (FIG. 3) that a user has "picked up" the phone 140 (FIG. 2), and that an outgoing call may be initiated. Thus, in one illustrative embodiment, once the cellular phone 305 (FIG. 3) receives the indication that the user has "picked up" the phone 140 (FIG. 2), the cellular telephone 305 (FIG. 3) blocks incoming calls. Hence, at this point, the system is ready for either pulse dialing or "tone" dialing. In another illustrative embodiment, the step of generating 840 signaling data on signaling line 355 (FIG. 3) may be completely.

Figure 10:
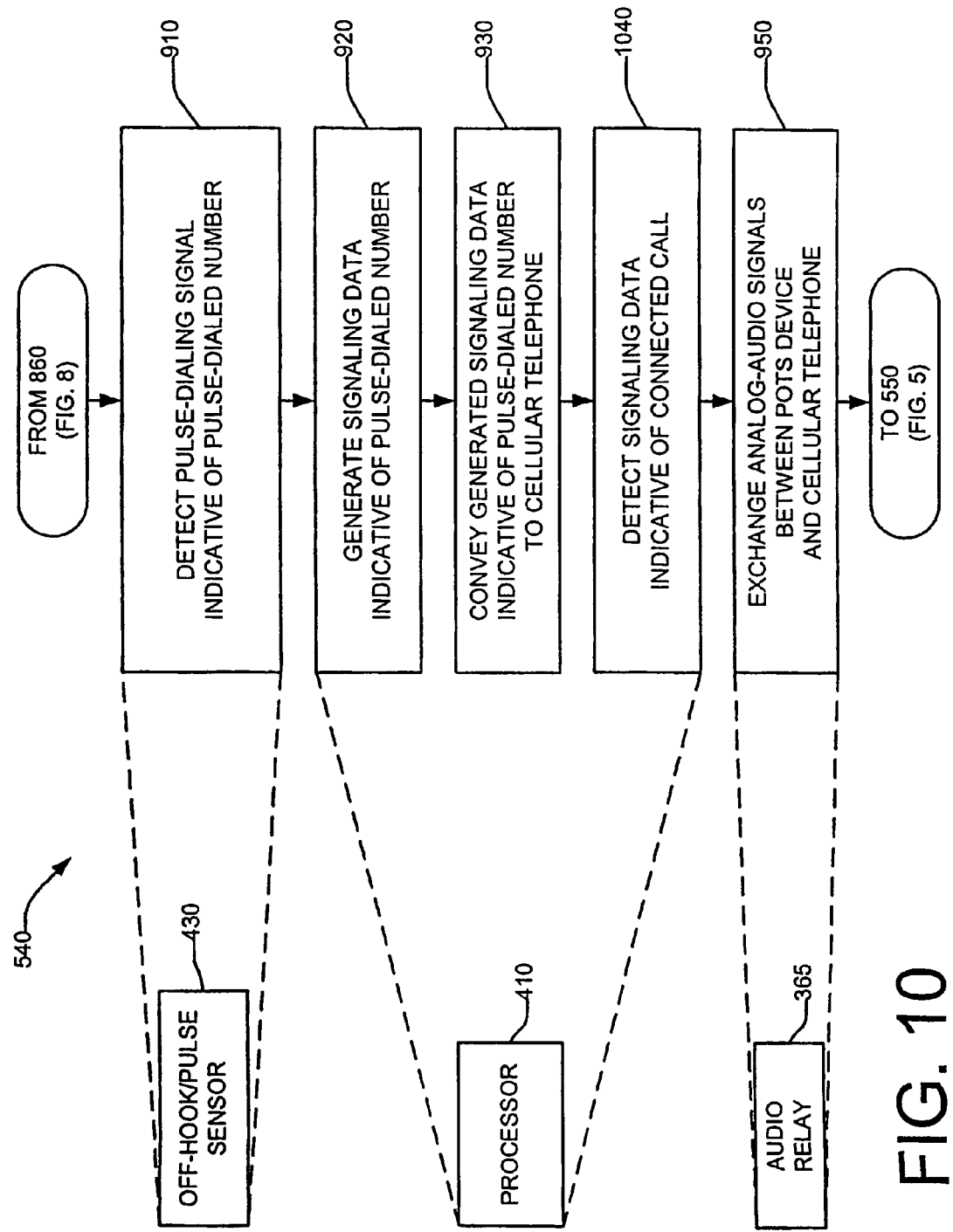

FIGS. 9 and 10 are flowcharts showing several illustrative embodiments of the method associated with pulse dialing. As shown in FIG. 9, in one illustrative embodiment, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number and a "send" command. The signaling data on signaling line 355 (FIG. 3) is conveyed, in step 930, to the cellular telephone 305 (FIG. 3), either with or without modification (e.g., amplification or attenuation), by the processor 410 (FIG. 4) through the cellular phone docking station 310 (FIG. 3).

In one illustrative embodiment, the numbers dialed by the POTS devices 140, 150 (FIG. 2) are stored in RAM 460, and, once a predetermined number of dialed numbers has been stored, the processor 410 (FIG. 4) conveys the stored numbers and a "send" command to the cellular telephone 305 (FIG. 3). In other words, upon receiving enough digits to dial a telephone number, as indicated by the configuration information in SRAM 450 (FIG. 4), the processor 410 (FIG. 4) commands the cellular telephone 305 (FIG. 3) to dial the outgoing number, thereby connecting a call from the POTS device 140, 150 (FIG. 2) through the cellular network. In another illustrative embodiment, the RAM 460 (FIG. 4) stores numbers as they are dialed by the POTS devices 140, 150 (FIG. 2). If, during dialing, the processor 410 (FIG. 4) detects a delay or a pause, then the processor 410 (FIG. 4) presumes that all of the digits of the telephone number have been dialed. Thus, the processor 410 (FIG. 4) commands the cellular telephone 305 to dial the outgoing number, thereby connecting the call from the POTS device 140, 150 (FIG. 2) through the cellular network. The command instructs the cellular telephone 305 (FIG. 3) to call the number that has been conveyed to the cellular telephone 305 (FIG. 3) by the signaling data on signaling line 355 (FIG. 3).

When the called party "picks up" the phone, the system detects, in step 940, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, once the outgoing call is connected between the cellular telephone 305 (FIG. 3) and the POTS device 140, 150 (FIG. 2), the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

FIG. 10 is a flowchart showing, in greater detail, another illustrative embodiment of the method associated with pulse dialing. As shown in FIG. 10, the off-hook/pulse sensor 430 (FIG. 4) detects, in step 910, a pulse-dialing signal that is indicative of a pulse-dialed number. In response to the pulse-dialing signal, the processor 410 (FIG. 4) generates, in step 920, signaling data on signaling line 355 (FIG. 3) that is indicative of the pulse-dialed number. The signaling data on signaling line 355 (FIG. 3) is conveyed, in step 930, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1040, the signaling data on signaling line 355 (FIG. 3). At this point, the processor 410 (FIG. 4) enables the audio relay 365 (FIG. 3), and analog-audio signals 345 (FIG. 3) are exchanged, in step 950, between the POTS device 140, 150 (FIG. 2) and the cellular telephone 305 (FIG. 3). Thus, again, the POTS device 140, 150 (FIG. 2) freely communicates through the cellular network.

In another illustrative embodiment, rather than waiting for the called party to "pick up" the phone, the system detects an analog-audio signal 345 (FIG. 3) that is indicative of a called-party telephone ringing or a called-party telephone being "busy." At this point, the processor 410 (FIG. 4) enables the audio relay 365 (FIG. 3), and analog-audio signals 345 (FIG. 3) are exchanged between the POTS device 140, 150 (FIG. 2) and the cellular telephone 305 (FIG. 3). Thus, once a called-party telephone ringing or a called-party telephone "busy" signal is detected, the cellular telephone 305 (FIG. 3) and the POTS device 140, 150 (FIG. 2) are connected through the cellular network.

Figure 11:
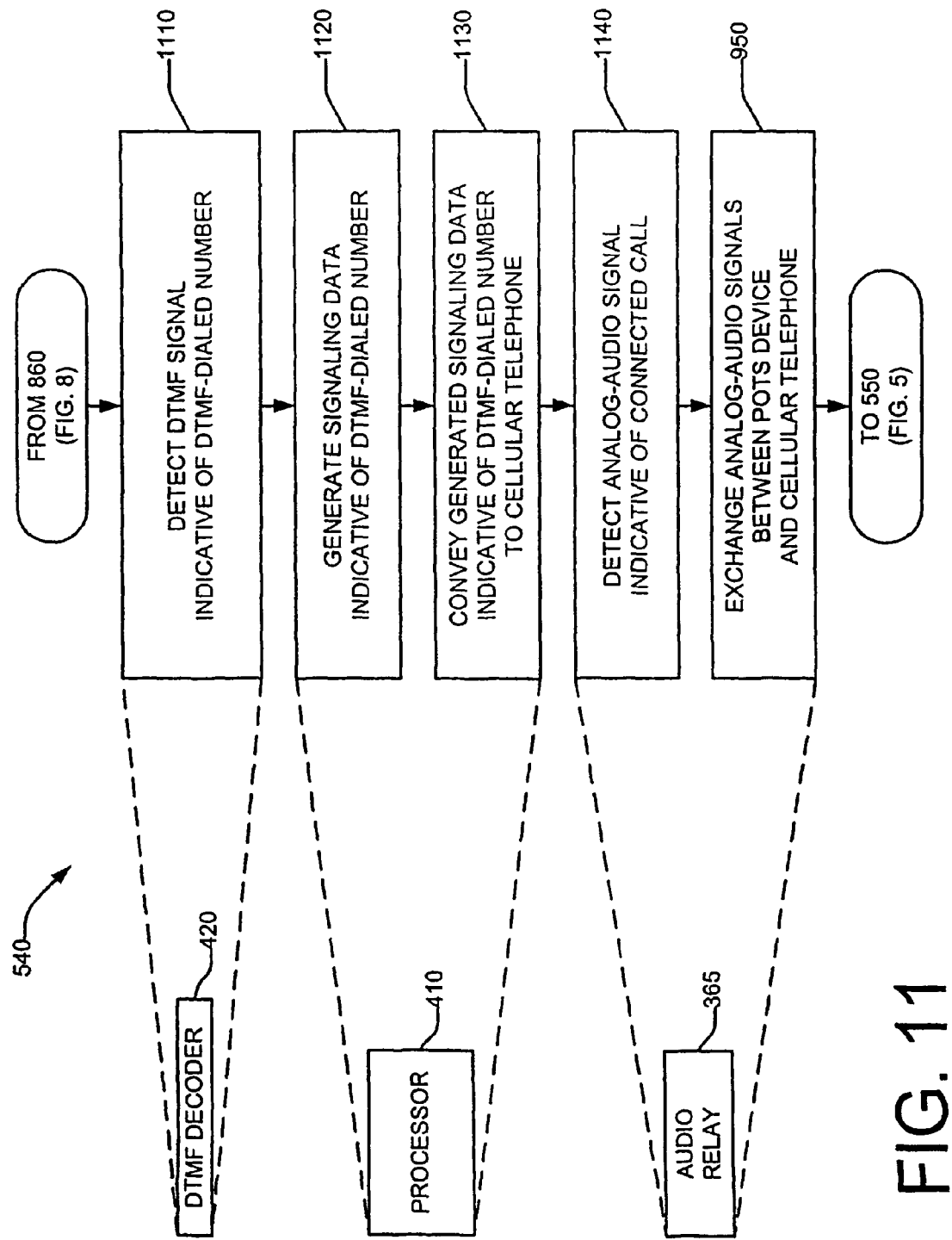
Figure 12:
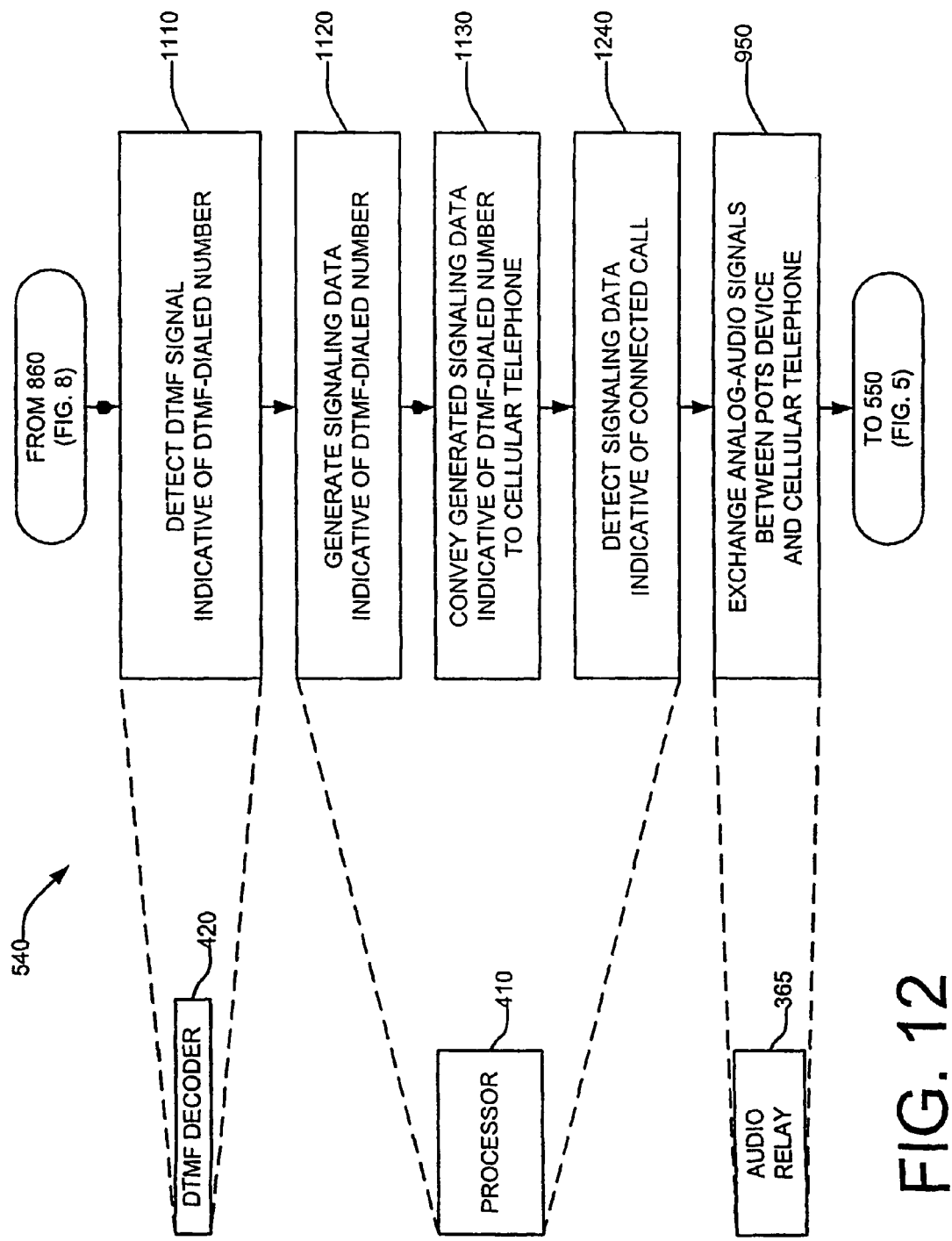

FIGS. 11 and 12 are flowcharts showing several illustrative embodiments of the method associated with "tone" dialing. As shown in FIG. 11, in one illustrative embodiment, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the system detects, in step 1140, an analog-audio signal 345 (FIG. 3) that is indicative of the connected call. At this point, the processor 410 (FIG. 4) enables the audio relay 365 (FIG. 3), and analog-audio signals 345 (FIG. 3) are exchanged, in step 1150, between the POTS device 140, 150 (FIG. 2) and the cellular telephone 305 (FIG. 3). Thus, once the incoming call is connected between the cellular telephone 305 (FIG. 3) and the POTS device 140, 150 (FIG. 2), the POTS device 140, 150 (FIG. 2) freely communicates through the cellular network.

FIG. 12 is a flowchart showing another illustrative embodiment of the method associated with "tone" dialing. As shown in FIG. 12, the DTMF decoder 420 (FIG. 4) detects, in step 1110, a DTMF signal that is indicative of a DTMF-dialed number. In response to the DTMF signal, the processor 410 (FIG. 4) generates, in step 1120, signaling data on signaling line 355 (FIG. 3) that is indicative of the DTMF-dialed number. The signaling data on signaling line 355 (FIG. 3) is conveyed, in step 1130, to the cellular telephone 305 (FIG. 3), either with or without modification, by the processor 410 (FIG. 4) through the cellular phone docking station 310 (FIG. 3). This instructs the cellular telephone 305 (FIG. 3) to call the number that has been conveyed to the cellular telephone 305 (FIG. 3) by the signaling data on signaling line 355 (FIG. 3). When the called party "picks up" the phone, the cellular telephone 305 (FIG. 3) generates signaling data on signaling line 355 (FIG. 3) that is indicative of the connected call, and the processor detects, in step 1240, the signaling data on signaling line 355 (FIG. 3). At this point, the processor 410 (FIG. 4) enables the audio relay 365 (FIG. 3), and analog-audio signals 345 (FIG. 3) are exchanged, in step 1150, between the POTS device 140, 150 (FIG. 2) and the cellular telephone 305 (FIG. 3). Thus, again, the POTS device 140, 150 (FIG. 2) freely communicates through the cellular network.

While several hardware components are shown with reference to FIGS. 3 and 4 to describe the interface controller 370, it will be clear to one of ordinary skill in the art that the interface controller 370 may be implemented in hardware, software, firmware, or a combination thereof. In one illustrative embodiment, the interface controller 370 (FIG. 3) is implemented in software or firmware that is stored in a memory and that is executed by a suitable instruction execution system. If implemented in hardware, as in FIGS. 3 and 4, the interface controller may be implemented with any or a combination of the following technologies: a discrete logic circuit having logic gates for implementing logic functions upon data signals, an application specific integrated circuit (ASIC) having appropriate combinational logic gates, a programmable gate array (PGA), a field programmable gate array (FPGA), etc.

Figure 13:
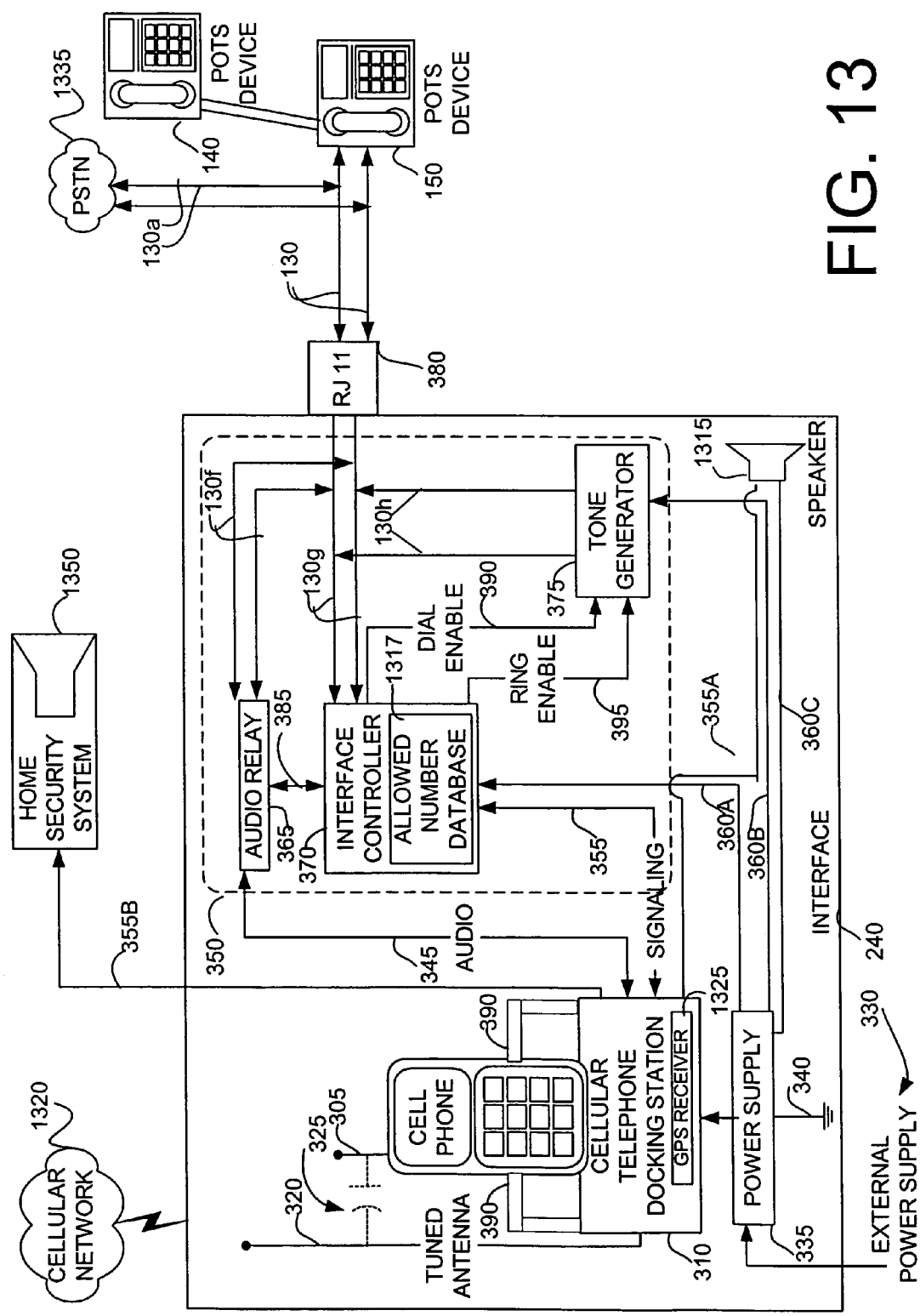
FIG. 13 is a block diagram showing an alternative illustrative embodiment of the interface 240 of FIG. 2.

FIG. 13 is a block diagram showing an alternative illustrative embodiment of the interface 240 of FIG. 3. As described above in the discussion of the illustrative embodiment of FIG. 3, the cellular network compatible signals are transmitted and received at the interface 240 by a cellular telephone 305 while the POTS compatible signals are transmitted and received at the interface 240 through a POTS connector 380, such as an RJ11 connector 380. As described above with respect to FIG. 3, the interface 240 in this illustrative embodiment comprises a cellular telephone docking station 310, including locking arms 390, that is configured to interface with the cellular telephone 305, an interface controller 370, a power supply 335, a speaker 1315, and a home security system 1350.

The cellular telephone docking station 310 is configured to convey signaling data, received from the interface controller 370 over the signaling line 355, to the cellular telephone 305. In the presently described illustrative embodiment, the signaling data on the signaling line 355 may include a DTMF-dialing signal indicative of a dialed number sequence, such as a telephone number from the POTS devices 140, 150. The cellular telephone docking station 310 also includes a location device, such as global positioning system (GPS) receiver 1325, for receiving location data from the cellular telephone 305. It will be appreciated that in the presently described illustrative embodiment, the cellular telephone 305 may be configured with a GPS or other location receiver which continuously or at predetermined intervals, transmits the current location of the cellular telephone 305. Those of ordinary skill in the art will appreciate that the cellular telephone docking station 310 may also be outfitted with a physical or electronic lock for preventing the removal of the cellular telephone 305.

The current location of the cellular telephone 305 may be obtained through communication with, for example, a GPS satellite or a land based navigation system. The cellular telephone 305 may also be capable of determining its location utilizing a cellular triangulation method well known to those of ordinary skill in the art. The cellular telephone 305 may also include a transmitter capable of transmitting its current location data or position information to the receiver 1325 in the cellular telephone docking station 310. The cellular telephone 305 may be programmed to execute various algorithms for determining, storing, and communicating the position information. Illustrative methods detailing the aforementioned algorithms, and others, for locating and tracking wireless devices is presented in U.S. Patent Application Publication No. US2003/0117316, entitled "Systems and Methods for Locating and Tracking a Wireless Device," published on Jun. 26, 2003, and assigned to the same assignee as this application, which is expressly incorporated herein, in its entirety, by reference.

The cellular telephone docking station 310 is also connected to the speaker 1315 and is capable of generating signaling over signaling line 355A for sounding an audible alarm when the cellular telephone has been moved outside of a predetermined range. For instance, when the cellular telephone docking station 310 detects, based on received location data at the receiver 1325, that the cellular telephone 305 is more than three feet away from it position in the docking station 310, the docking station 310 may be configured to generate an audio signal over the signaling line 355A to sound an audible alarm over the speaker 1315. Persons of ordinary skill in the art will appreciate that the cellular telephone docking station 310 may be configured to incorporate Ultra Wide Band (UWB) wireless communications technology to actively determine and monitor the distance the cellular telephone 305 is away from the docking station 310. Persons of ordinary skill in the art will further appreciate that the docking station 310 may also be configured with a memory and a processor for executing programmed instructions for setting the predetermined range of the cellular telephone 305 and generating the signaling necessary to sound the audible alarm over the speaker 1315. The cellular telephone docking station 310 may also be connected to the home security system 1350 over a signaling line 355B. The cellular telephone docking station 310 may be configured to generate signaling over the signaling line 355B to the home security system 1350 indicating that the cellular telephone 305 has been moved out of the predetermined range. An illustrative method detailing the restriction of the movement of the cellular telephone 305 from the docking station 310 will be discussed in greater detail with respect to FIG. 15, below.

The interface controller 370 is configured to convey signaling data indicative of a dialed number sequence to the cellular telephone 305 through the cellular telephone docking station 310. The interface controller 370 includes the DTMF decoder 420, the ROM 440, the RAM 460, and the processor 410 discussed above with respect to FIG. 4. The DTMF decoder 420 (FIG. 4) generates a dialing signal corresponding to a dialed number sequence initiated from the POTS devices 140, 150.

As discussed above with respect to FIG. 4, the DTMF decoder 420 is configured to detect dialing from POTS devices 140, 150 that are configured for DTMF or "tone" dialing. The DTMF decoder 420 (FIG. 4) generates a DTMF-dialing signal of the number that was dialed and transmits the signal to the processor 410 (FIG. 4), which converts the DTMF-dialing signal into signaling data on the signaling line 355 that is indicative of the number that was dialed. During normal operation, the signaling data on the signaling line 355 is transmitted from the processor 410 (FIG. 4) to the cellular telephone 305 through the cellular phone docking station 310. The cellular telephone 305 subsequently dials the number indicated by the signaling data on the signaling line 355, thereby allowing the POTS device 140, 150 to make a call using the cellular network 1320.

The interface controller 370 also includes an allowed number database 1317 which may be stored in the ROM 440 (FIG. 4). The allowed number database 1317 includes a sequence list which may include telephone numbers or area codes. The numbers in the sequence list may be used to restrict the dialing of telephone numbers from the POTS devices 140, 150 when using the cellular telephone 305 as a bridge for making telephone calls using the cellular network 1320, as discussed in the description of FIGS. 5-12, above. For example, the sequence list may only include local area codes to prevent the dialing of long distance numbers from the POTS devices 140, 150. An illustrative method detailing the restriction of the use of the cellular telephone 305 and the POTS devices 140, 150 will be discussed in greater detail with respect to FIG. 14, below.

The power supply 335 is configured to provide the components of the interface 240 with the requisite power. In this sense, the power supply 335 is connected to an external power supply 330 from which it receives external power. The external power is converted by the power supply 335 to a DC voltage, which is used to power the cellular phone docking station 310, the tone generator 375, the interface controller 370, the speaker 1315, and any other device in the interface 240 that may be powered by a DC source.

The locking arms 390 may be configured to function as a lock to hold the cellular telephone 305 in the docking station 310 such that the cellular telephone 305 may not be removed. Those skilled in the art will appreciate that the locking arms 390 may comprise electromagnetically-actuated bars for holding the sides of the cellular telephone 305 when the lock is actuated. It will be appreciated that the docking station 310 may also comprise a lockable box (not shown) with a cover for physically locking the cellular telephone 305. It will be appreciated that other means for locking the cellular telephone 305 to the docking station 310 will be readily apparent to those skilled in the art.

Figure 14:
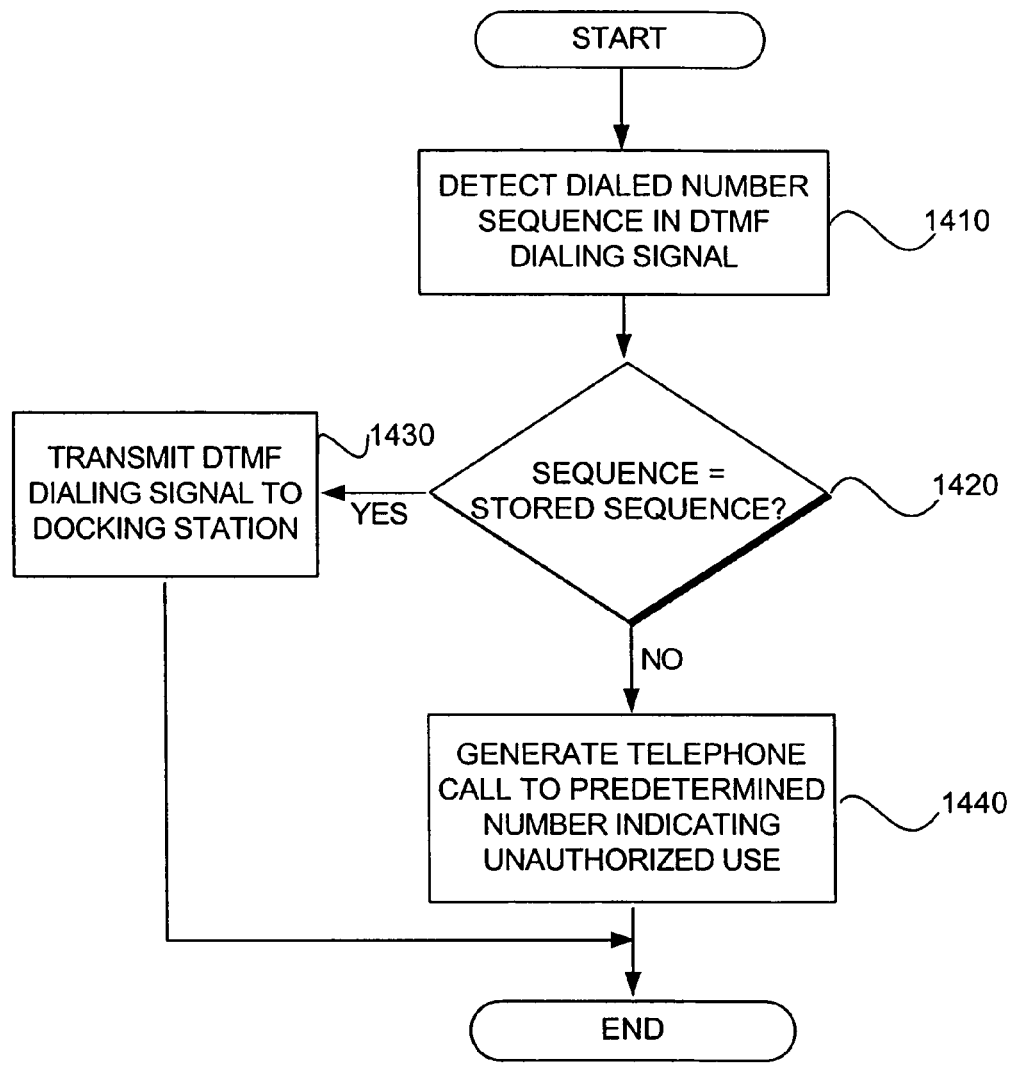
FIGS. 14 through 15 are flowcharts showing several illustrative embodiments of the method associated with the restriction and use of POTS devices and cellular telephones.

FIG. 14 is a flowchart showing an illustrative embodiment of a method for restricting the use of the POTS devices 140, 150 over the cellular network 1320. As shown in FIG. 14, the processor 410 (FIG. 4) in the interface controller 370 detects, at step 1410, a dialed telephone number in the DTMF-dialing signal received from the DTMF decoder 420 (FIG. 4). The processor 410 then, at step 1420, compares the numerical sequence in the telephone number to the list of numbers in the allowed number database 1317. In particular, the telephone number or a portion thereof (such as the area code) is compared to a list of allowed telephone numbers or area codes specified by a user in the list.

If, at step 1420, the telephone number (or portion thereof such as the area code) in the received DTMF-dialing signal matches a numerical sequence in the database 1317, then the processor 410 transmits, at step 1430, the DTMF-dialing signal to the cellular telephone docking station 310 for dialing on the cellular telephone 305. If however, at step 1420, the telephone number (or portion thereof such as the area code) in the received DTMF-dialing signal does not match a numerical sequence in the database 1317, then the processor 410 does not transmit the DTMF-dialing signal to the cellular telephone docking station 310 (thereby preventing the call from being made) and generates, at step 1440, a telephone call to a predetermined telephone number indicating an attempt was made to dial an unauthorized telephone number. In particular, the interface controller 370 may be configured generate a dialing signal indicative of the predetermined telephone number utilizing the processor 410 (FIG. 4) and the tone generator 375 (FIG. 4) to place a telephone call, utilizing the POTS lines 130 and 130*a* connected to the RJ11 connector 380, over the PSTN 1335. It will be appreciated that the processor 410 (FIG. 4) may be programmed to only access the allowed number database during a predetermined time period. For instance, the allowed number database may only be accessed during working hours on weekdays when the subscriber is away from home and unable to actively monitor unauthorized calls.

Figure 15:
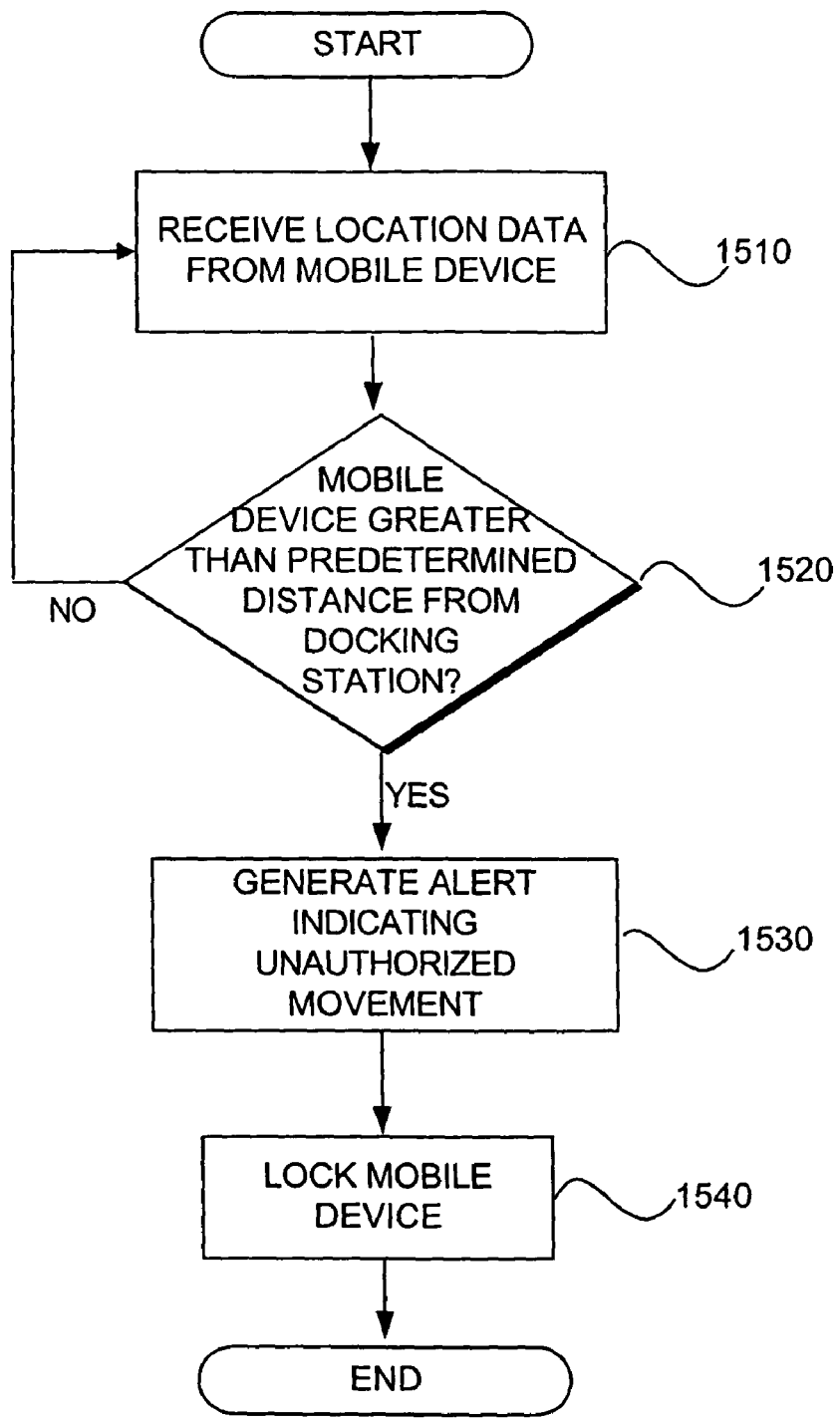

FIG. 15 is a flowchart showing an illustrative embodiment of a method for restricting the movement of the cellular telephone 305 from the cellular telephone docking station 310. As shown in FIG. 15, the docking station 310 receives, at step 1510, current location data from the cellular telephone 305 at the receiver 1325. The docking station 310 then determines, at step 1520, if the cellular telephone 305 is greater than a predetermined distance from the docking station 310.

If, at step 1520, the location data indicates that the cellular telephone 305 is located within the predetermined distance, then the method returns to step 1510 where the docking station continues to receive location data from the cellular telephone 305. If however, at step 1520, the location data indicates that the cellular telephone 305 is located outside of the predetermined distance, then the docking station 310 generates, at step 1530, an alert indicating unauthorized movement of the cellular telephone 305. In particular, the docking station 310 may generate an alarm signal on the signaling line 355A to emit an audible alert over the connected speaker 1315. Alternatively, the docking station 310 may generate a signal on the signaling line 355B to the home security system 1350 which could also emit an alarm.

The docking station 310 may also lock, at 1540, the cellular telephone 305 once it has been detected outside of the predetermined range. In particular, the interface controller 370 may be configured to generate a jamming signal over the signaling line 355 thereby causing the tuned antenna 320 connected to the docking station 310 to send out an interference signal, such as a 900 Mhz/1900 Mhz signal, to the cellular telephone 305, thereby jamming communication between the cellular telephone 305 and the cellular network 1320. Various jamming methods which may be utilized in illustrative embodiments of the invention are well known to those skilled in the art.

While illustrative embodiments of the present invention have been shown and described, it will be apparent to those of ordinary skill in the art that a number of changes, modifications, or alterations to the invention as described may be made, none of which depart from the spirit of the present invention. For example, while a cellular telephone 305 (FIG. 13) is used as the bridge between the POTS devices 140, 150 and the cellular network, it will be clear to one of ordinary skill in the art that any cellular device may be used as the bridge, such as a cellular compatible personal digital assistant (PDA), cellular modem, or any other cellular device that is configured to transmit and receive data from a cellular network. Furthermore, while the flowcharts of FIGS. 14-15 show several illustrative embodiments of the method as being performed in sequential order, it will be clear to one of ordinary skill in the art that several of the method steps may be taken out of order without adverse effect to the invention. For example, the step of locking the cellular telephone in FIG. 15 may be performed prior to the step of generating the alert indicating unauthorized movement or the step may be completely removed without detriment to the invention. These and other such changes, modifications, and alterations should therefore be seen as within the scope of the present invention.

We claim:

1. A system for restricting the use of a wireline telephony device with a wireless communications network, comprising:
   an interface between the wireline telephony device and a docking station, the interface configured to
      detect a dialed sequence of numbers entered into the wireline telephony device, the docking station coupled to a cellular telephone which places calls on the wireless communication network from the wireline telephony device based on the dialed sequence of numbers entered into the wireline telephony device,
      determine whether the dialed sequence of numbers matches an allowed sequence of numbers stored in the interface, and
      if the dialed sequence of numbers does not match the allowed sequence of numbers stored in the interface, then prevent the wireline telephony device from communicating with the wireless communications network through the docking station by preventing transmission of the dialed sequence of numbers to the docking station and generate a telephone call to a predetermined telephone number to indicate that an attempt was made to dial an unauthorized sequence of numbers; and
   at least one device connector configured to couple the wireline telephony device to the interface, wherein the interface converts the dialed sequence of numbers entered into the wireline telephony device into a digital command-compatible with the wireless communications network.

2. The system of claim 1, wherein the interface comprises an interface controller configured to convey signaling to the wireline telephony device and receive signaling from the wireline telephony device.

3. The system of claim 2, wherein the interface comprises a DTMF decoder, wherein the DTMF decoder is configured to detect the dialed sequence and wherein the DTMF decoder is further configured to generate a DTMF-dialing signal indicative of the dialed sequence.

4. The system of claim 3, wherein the docking station is configured to convey the DTMF-dialing signal indicative of the dialed sequence generated by the DTMF decoder.

5. The system of claim 4, wherein the interface controller further comprises a processor, wherein the processor is configured:
   to receive the DTMF-dialing signal indicative of the dialed sequence from the DTMF decoder;
   to compare the sequence to a stored sequence list in the interface controller; and
   to transmit the DTMF-dialing signal indicative of the dialed sequence to the docking station.

6. The system of claim 5, wherein the processor transmits the DTMF-dialing signal indicative of the dialed sequence to the docking station if the dialed sequence matches a stored sequence in the stored sequence list.

7. The system of claim 4, wherein the cellular telephone is configured to receive the DTMF-dialing signal from the docking station.

8. The system of claim 5, wherein the processor does not transmit the DTMF-dialing signal indicative of the dialed sequence to the docking station if the dialed sequence does not match a stored sequence in the stored sequence list.

9. A method for restricting the use of a wireline telephony device with a wireless communications network, comprising:
 detecting a dialed sequence of numbers entered into the wire line telephony device;
 determining whether the dialed sequence of numbers matches an allowed sequence of numbers stored in an interface; and
 if the dialed sequence of numbers does not match the allowed sequence of numbers stored in the interface, then
  preventing the wireline telephony device from communicating with a docking station coupled to a cellular telephone by preventing transmission of the dialed sequence of numbers to the docking station, the cellular telephone for communicating messages from the wireline telephony device over the wireless communications network, wherein the interface converts the dialed sequence of numbers entered into the wireline telephony device into a digital command compatible with the wireless communications network, and
  generating a telephone call to a predetermined telephone number to indicate that an attempt was made to dial an unauthorized sequence of numbers.

10. The method of claim 9 wherein detecting a dialed sequence of numbers entered into a wire line telephony device comprises detecting a DTMF-dialing signal indicative of the dialed sequence.

11. The method of claim 10, wherein preventing the wireline telephony device from communicating with the communications network when the dialed sequence does not match an allowed sequence of numbers stored in an interface comprises:
 comparing the dialed sequence to a stored sequence list in the interface, the stored sequence list comprising the allowed sequence of numbers; and
 if the dialed sequence does not match a sequence of numbers in the sequence list, then preventing the transmission of the DTMF-dialing signal indicative of the dialed sequence.

12. The method of claim 10 further comprising enabling the wireline telephony device to communicate with the wireless communications network when the dialed sequence matches the allowed sequence of numbers stored in the interface, wherein access to the allowed sequence of numbers stored in the interface is restricted to a predetermined time period within at least one day of a week.

13. The method of claim 12, wherein preventing the wireline telephony device from communicating with the communications network when the dialed sequence matches the allowed sequence of numbers stored in the interface comprises:
 comparing the dialed sequence to a stored sequence list in the interface, the stored sequence list comprising the allowed sequence of numbers; and
 if the dialed sequence matches the sequence of numbers in the sequence list, then transmitting the DTMF-dialing signal indicative of the dialed sequence.

14. The method of claim 9, wherein the dialed sequence comprises a telephone number.

15. A computer-readable medium having computer-executable instructions stored thereon which, when executed by a computer, will cause the computer to perform a method for restricting the use of a wire line telephony device with a wireless communications network, the method comprising:
 detecting a dialed sequence of numbers entered into the wire line telephony device;
 determining whether the dialed sequence of numbers matches an allowed sequence of numbers stored in an interface; and
 if the dialed sequence of numbers does not match the allowed sequence of numbers stored in the interface, then
  preventing the wireline telephony device from communicating with a docking station coupled to a cellular telephone by preventing transmission of the dialed sequence of numbers to the docking station, the cellular telephone for communicating messages from the wireline telephony device over the wireless communications network, wherein the interface converts the dialed sequence of numbers entered into the wireline telephony device into a digital command compatible with the wireless communications network, and
  generating a telephone call to a predetermined telephone number to indicate that an attempt was made to dial an unauthorized sequence of numbers.

16. The computer-readable medium of claim 15 wherein detecting a dialed sequence of numbers entered into a wireline telephony device comprises detecting a DTMF-dialing signal indicative of the dialed sequence.

17. The computer-readable medium of claim 15 further comprising enabling the wireline telephony device to communicate with the wireless communications network when the dialed sequence matches the allowed sequence of numbers stored in the interface.

18. The computer-readable medium of claim 15 wherein preventing the wireline telephony device from communicating with the communications network when the dialed sequence does not match an allowed sequence of numbers stored in an interface comprises:
 comparing the dialed sequence to a stored sequence list in the interface, the stored sequence list comprising the allowed sequence of numbers; and
 if the dialed sequence does not match a sequence of numbers in the sequence list, then preventing the transmission of the DTMF-dialing signal indicative of the dialed sequence.

* * * * *